(12) United States Patent
Yang et al.

(10) Patent No.: US 11,986,953 B2
(45) Date of Patent: May 21, 2024

(54) MOBILE ROBOT

(71) Applicant: LG ELECTRONICS INC., Seoul (KR)

(72) Inventors: Hyunjae Yang, Seoul (KR); Moonchan Kim, Seoul (KR); Iljae Lee, Seoul (KR); Sangwook Lee, Seoul (KR); Sanghun Mun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 17/722,006

(22) Filed: Apr. 15, 2022

(65) Prior Publication Data

US 2023/0191633 A1    Jun. 22, 2023

(30) Foreign Application Priority Data

Dec. 22, 2021    (KR) .................. 10-2021-0184869

(51) Int. Cl.
*B25J 19/00* (2006.01)
*B25J 5/00* (2006.01)
*B25J 19/02* (2006.01)

(52) U.S. Cl.
CPC .......... *B25J 19/0066* (2013.01); *B25J 5/007* (2013.01); *B25J 19/022* (2013.01); *B25J 19/023* (2013.01); *B25J 19/026* (2013.01)

(58) Field of Classification Search
CPC ....... Y10S 901/01; Y10S 901/08; B25J 9/162; B25J 9/042; B25J 9/1612; B25J 11/008; B25J 19/0066; B25J 19/023; B25J 19/0075; B25J 19/022; G05D 1/0016; G05D 1/0221; G05B 2219/45083; G05B 2219/40193
USPC ............. 901/1, 3, 8, 19; 318/568.11, 568.12
See application file for complete search history.

(56) References Cited

FOREIGN PATENT DOCUMENTS

CN         101134313 A    *    3/2008    .......... B25J 11/0025

OTHER PUBLICATIONS

Han, Guang, Explosive and Danger Removal Robot Mar. 5, 2008, Clarivate Analytics, Copyright 2023, pp. 1-6 (Year: 2008).*

* cited by examiner

*Primary Examiner* — Antony M Paul
(74) *Attorney, Agent, or Firm* — Birch, Stewart, Kolasch & Birch, LLP

(57) ABSTRACT

A mobile robot includes a driver configured to provide a traveling function, a body disposed at an upper side of the driver and configured to include a head coupling hole formed at an upper portion thereof, and a head configured to include a head bracket inserted into the head coupling hole of the body. The body includes a head fixing frame fastened to the head bracket, a first bolt configured to fix the head fixing frame and the head bracket, and a repair cover coupled to an opening formed in a backward direction. The head is separated from the body when the first bolt is released by opening the repair cover.

20 Claims, 21 Drawing Sheets

MOBILE ROBOT

CROSS-REFERENCE TO RELATED APPLICATION

This application claims the benefit of Korean Patent Application No. 10-2021-0184869, filed on Dec. 22, 2021, which is hereby incorporated by reference as if fully set forth herein.

BACKGROUND OF THE INVENTION

Field of the Invention

The present disclosure relates to a mobile robot capable of freely moving in public places and providing guidance and various services to people.

Discussion of the Related Art

To take charge of a portion of factory automation, robots have been developed for industrial use. Recently, the application range of robots has been further expanded, and robots that can be used in daily life as well as medical robots and aerospace robots are being developed.

Such a robot for daily life is being developed to provide a specific service (e.g., shopping, serving, conversation, cleaning, etc.) in response to a user command. Existing electronic display boards and information boards are mediums that unilaterally deliver only information selected by an information provider, so that the existing electronic display boards and information boards have disadvantages in that individual users have difficulty in obtaining desired information.

In public places, a person (i.e., a guide) in charge of guidance is required, and in some cases, if there is a user request for information that is unknown to the guide, the guide cannot provide the user with desired information.

There is a need to provide services such as guidance of public places using a robot so that labor costs can be reduced and information desired by a user can be maximally provided to the user. In addition, the user who uses a mobile robot rather than a fixed kiosk can more easily obtain desired information.

The mobile robot can not only provide information, but also can simultaneously perform collection of user information, cleaning and management services, etc. while moving in public places, thereby expanding the application range thereof.

SUMMARY OF THE INVENTION

An object of the present disclosure is to provide a mobile robot capable of replacing a head module with another to expand or change a function thereof.

Another object of the present disclosure is to provide a mobile robot including a vent hole so that the mobile robot can discharge heat inside the vent hole to the outside by a driving function thereof.

Another object of the present disclosure is to provide a mobile robot capable of handling many more users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one embodiment of the present disclosure, a mobile robot includes a driver configured to provide a traveling function; a body disposed at an upper side of the driver, and configured to include a head coupling hole formed at an upper portion thereof; and a head configured to include a head bracket inserted into the head coupling hole of the body. The body includes a head fixing frame fastened to the head bracket, a first bolt configured to fix the head fixing frame and the head bracket, and a repair cover coupled to an opening formed in a backward direction. The head is separated from the body when the first bolt is released by opening the repair cover.

The mobile robot may further include a guide rib formed to protrude from an end of the head bracket, a top plate to which the head fixing frame is coupled, and a guide groove formed around the head fixing frame of the top plate, and allowing the guide rib to be inserted therein.

The body may include a connection port disposed adjacent to the head fixing frame. The head may include a head display disposed at a front surface of the head, and a connection cable, one side of which is connected to the head display and extends downward along the head bracket, and the other side of which is inserted into the connection port.

The head bracket may be configured to form an inner space in which three sides are closed and one side is opened, and formed to extend in a vertical direction. The connection cable may extend into the body along the inner space of the head bracket.

The head bracket may include an opening formed in a backward direction, and the connection cable may be formed to pass through the opening so that the other end of the connection cable is inserted into the connection port.

The head may include a head rear cover coupled to a rear surface thereof, wherein the head rear cover is selectively coupled to any one of a general cover and a camera cover equipped with a head camera.

The body may include a connection port disposed adjacent to the head fixing frame. The head may include a cradle disposed at an upper portion of the head bracket and formed to include a flat top surface, a head camera disposed on the cradle, and a connection cable, one side of which is connected to the head camera and extends downward along the head bracket, and the other side of which is inserted into the connection port.

The mobile robot may further include a second bolt through which the repair cover is fastened to the body.

The mobile robot may further include a top cover fastened to the head coupling hole from which the head is removed.

The top cover may include a cover portion formed in correspondence to a shape of the head coupling hole, and a hook formed around a bottom circumference of the cover portion. The body may further include a hook groove disposed in the head coupling hole and fastened to the hook.

The mobile robot may further include an insertion portion protruding from a lower portion of the cover portion and configured to protrude toward the inside of the body. The insertion portion is pushed by opening the repair cover so that the top cover is separated.

The mobile robot may further include one pair of displays disposed at front and rear surfaces of the body, a body profile located at left and right sides of the body and formed to extend in a vertical direction, and a display support fixed to the body profile to extend in forward and backward directions, and coupled to each of the displays.

The display support may include an upper display support disposed at an upper portion of the body, a lower display support disposed at a lower portion of the body, and a middle display support disposed between the upper display support and a lower display support. The upper display support may be shorter in length than the middle display support, and the lower display support may be longer in length than the middle display support.

The lower display support may include a support portion disposed at a lower portion of the display to support a lower end of the display.

The display support may further include a wing portion formed to extend in an opposite direction to the display.

The mobile robot may further include a side reinforcement frame fastened to the wing portion and extending in a vertical direction, and a fastening protrusion formed to protrude from a fastening portion formed in the side reinforcement frame and coupled to a body case forming an outer appearance of the body.

The body may include a concave portion recessed inward from a surface thereof, a vent hole formed at an upper side of the concave portion, and a guide inclined surface formed at a lower side of the concave portion. During traveling of the driver, air is introduced into the body through the vent hole.

The mobile robot may further include a sound hole formed at the guide inclined surface, and a speaker disposed in the sound hole.

The mobile robot may further include a waterproof film disposed in the sound hole.

The mobile robot may further include a speaker roof formed to cover the vent hole disposed at an upper side of the sound hole, wherein the sound hole is located at an inner position than an outer end of the speaker roof.

It is to be understood that both the foregoing general description and the following detailed description of the present disclosure are exemplary and explanatory and are intended to provide further explanation of the invention as claimed.

As is apparent from the above description, the mobile robot according to the present disclosure can freely replace a head module so that it is easy to expand or change the function thereof.

The mobile robot can allow air to be introduced into the vent hole by a driving operation thereof, so that heat inside the mobile robot can be discharged without using a separate cooling fan.

As a speaker is arranged in the mobile robot using the vent hole, the number of openings formed on the exterior of the mobile robot can be reduced.

The speaker of the mobile robot is arranged in a manner that sound is output in an upward direction from a lower portion of the speaker toward a user's face, difficulties in using the mobile robot in public places can be minimized, and even a short user can easily hear the sound generated by the mobile robot.

In addition, a display is arranged at both sides of the mobile robot, so that the number of users capable of being handled by only one mobile robot can increase.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
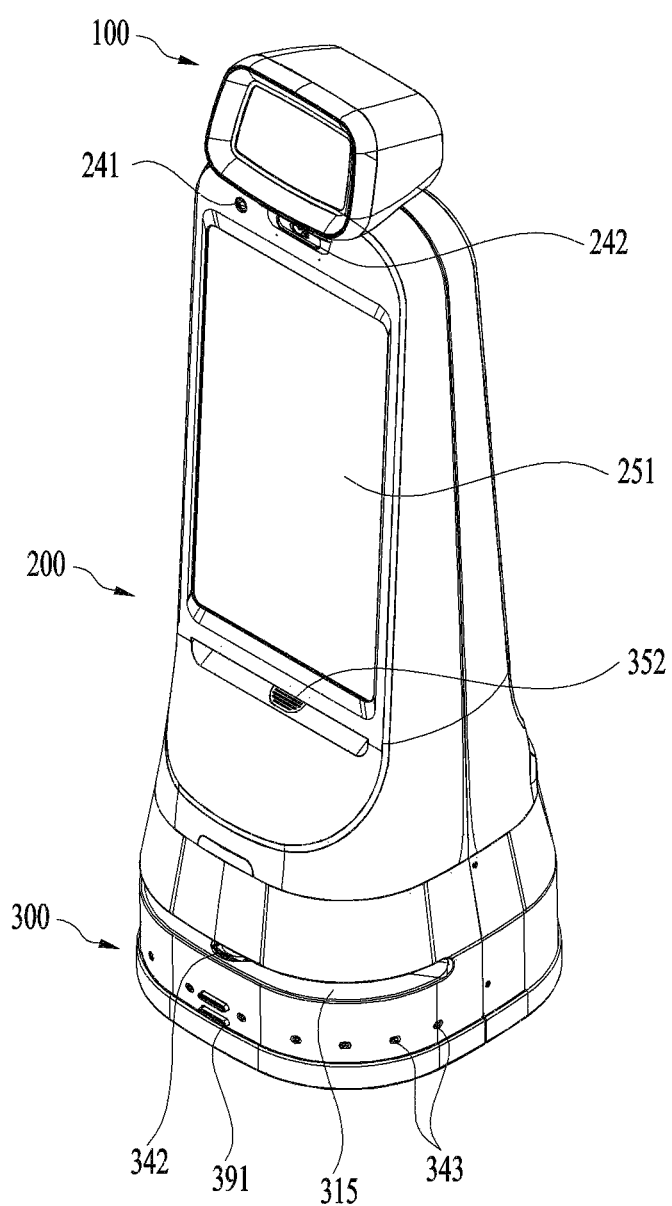
FIG. 1 is a front perspective view illustrating a mobile robot according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A robot is a machine device capable of automatically performing a certain task or operation. The robot may be controlled by an external control device or may be embedded in the control device. The robot can perform tasks that are difficult for humans to perform, such as repeatedly processing only a preset operation, lifting a heavy object, performing precise tasks or a hard task in extreme environments.

In order to perform such tasks, the robot includes a driver such as an actuator or a motor, so that the robot can perform various physical operations, such as moving a robot joint.

Industrial robots or medical robots having a specialized appearance for specific tasks due to problems such as high manufacturing costs and dexterity of robot manipulation were the first to be developed. Whereas industrial and medical robots are configured to repeatedly perform the same operation in a designated place, mobile robots have recently been developed and introduced to the market. Robots for use in the aerospace industry can perform exploration tasks or the like on distant planets that are difficult for humans to directly go to, and such robots have a driving function.

In order to perform the driving function, the robot has a driver, wheel(s), a frame, a brake, a caster, a motor, etc. In order for the robot to recognize the presence or absence of surrounding obstacles and move while avoiding the surrounding obstacles, an evolved robot equipped with artificial intelligence has recently been developed.

Artificial intelligence refers to a technical field for researching artificial intelligence or a methodology for implementing the artificial intelligence. Machine learning refers to a technical field for defining various problems handled in the artificial intelligence field and for researching methodologies required for addressing such problems. Machine learning is also defined as an algorithm that improves performance of a certain task through continuous experience.

An artificial neural network (ANN) is a model used in machine learning, and may refer to an overall model having problem solving ability, which is composed of artificial neurons (nodes) that form a network by a combination of synapses. The artificial neural network (ANN) may be defined by a connection pattern between neurons of different layers, a learning process of updating model parameters, and an activation function of generating an output value.

The artificial neural network (ANN) may include an input layer and an output layer, and may optionally include one or more hidden layers. Each layer includes one or more neurons, and the artificial neural network (ANN) may include a synapse that interconnects neurons and other neurons.

In the artificial neural network (ANN), each neuron may output a function value of an activation function with respect to input signals received through synapses, weights, and deflection.

A model parameter may refer to a parameter determined through learning, and may include the weight for synapse connection and the deflection of neurons. In addition, the hyperparameter refers to a parameter that should be set before learning in a machine learning algorithm, and includes a learning rate, the number of repetitions, a mini-batch size, an initialization function, and the like.

The purpose of training the artificial neural network (ANN) can be seen as determining model parameters that minimize a loss function according to the purpose of the robot or the field of use of the robot. The loss function can be used as an index for determining an optimal model parameter in a learning process of the artificial neural network (ANN).

Machine learning can be classified into supervised learning, unsupervised learning, and reinforcement learning according to learning methods.

Supervised learning refers to a method for training the artificial neural network (ANN) in a state where a label for learned data is given. Here, the label may refer to a correct answer (or a resultant value) that should be inferred by the artificial neural network (ANN) when the learned data is input to the artificial neural network (ANN). Unsupervised learning may refer to a method for training the artificial neural network (ANN) in a state where a label for learned data is not given. Reinforcement learning may refer to a learning method in which an agent defined in the certain environment learns to select an action or sequence of actions that can maximize cumulative compensation in each state.

Among artificial neural networks, machine learning implemented as a deep neural network (DNN) including a plurality of hidden layers is also referred to as deep learning, and deep learning is a part of machine learning. Hereinafter, machine learning is used in a sense including deep learning.

Artificial intelligence (AI) technology is applied to the robot, so that the robot can be implemented as a guide robot, a transportation robot, a cleaning robot, a wearable robot, an entertainment robot, a pet robot, and an unmanned aerial robot, etc.

The robot may include a robot control module for controlling operation thereof, and the robot control module may refer to a software module or a chip implemented in hardware.

By means of sensor information obtained from various types of sensors, the robot may acquire state information of the robot, may detect (recognize) the surrounding environment and the object, may generate map data, may determine a travel route and a travel plan, may determine a response to user interaction, or may determine a necessary operation.

The robot may perform the above-described operations using a learning model composed of at least one artificial neural network (ANN). For example, the robot may recognize the surrounding environment and object using a learning model, and may determine a necessary operation using the recognized surrounding environment information or object information. Here, the learning model may be directly learned from the robot or learned from an external device such as an AI server.

In this case, whereas the robot can perform a necessary operation by directly generating a result using the learning model, the robot may also perform an operation by transmitting sensor information to an external device such as an AI server and receiving the resultant information generated thereby.

The robot can perform autonomous driving through artificial intelligence. Autonomous driving refers to a technique in which a movable object such as a robot can autonomously determine an optimal path by itself and can move while avoiding collision with an obstacle. The autonomous driving technique currently being applied may include a technique in which the movable object (e.g., a robot) can travel while maintaining a current driving lane, a technique in which the movable object can travel while automatically adjusting a driving speed such as adaptive cruise control, a technique in which the movable object can automatically travel along a predetermined route, and a driving technique in which, after a destination is decided, a route to the destination is automatically set.

In order to perform autonomous driving, the movable object such as the robot may include a large number of sensors to recognize data of the surrounding situation. For example, the sensors may include a proximity sensor, an illumination sensor, an acceleration sensor, a magnetic sensor, a gyro sensor, an inertial sensor, an RGB sensor, an infrared (IR) sensor, a fingerprint recognition sensor, an ultrasonic sensor, an optical sensor, a microphone, a lidar, a radar, and the like.

The robot can perform autonomous driving not only based on information collected by sensors, but also based on image information collected by an RGBC camera and an infrared (IR) camera and sound information collected through a microphone. In addition, the robot can travel based on information received through a user input unit. Map data, location information, and information about peripheral situations can be collected through a wireless communication unit. The collected information is requisite for autonomous driving.

Map data may include object identification information for various objects disposed in a space where the robot moves. For example, the map data may include object identification information for fixed objects such as a wall and a door, and other object identification information for movable objects such as a flowerpot and a desk. In addition, the object identification information may include a name, a type, a distance, a location, etc.

Therefore, the robot may essentially include sensors, various input units, a wireless communication unit, and the like to collect data that can be learned by artificial intelligence, and can perform optimal operations by synthesizing various types of information. The learning processor for performing artificial intelligence can perform learning by being mounted in a controller embedded in the robot, can transmit the collected information to a server, can perform learning through the server, and can retransmit the learned result to the robot, so that the robot can perform autonomous driving based on the learned result.

A robot equipped with artificial intelligence can collect the surrounding information even in a new place to implement the entire map, and a large amount of information about a place of the major activity zone can be accumulated, so that the robot can perform more accurate autonomous driving.

The robot may include a touchscreen or a button to receive a user input, and may receive a command by recognizing a user's voice. In order to convert a voice input signal into a character string, the processor may obtain information about the intention corresponding to the user input using at least one of a speech to text (STT) engine for converting a voice input into a character string and a natural language processing (NLP) engine for obtaining information about the intention of natural language.

In this case, at least one of the STT engine and the NLP engine may include an artificial neural network (ANN) trained by a machine learning algorithm. In addition, at least one of the STT engine and the NLP engine may be trained by the learning processor, may be trained by the learning processor of the AI server, or may be trained by distributed processing of the trained results.

Figure 2:
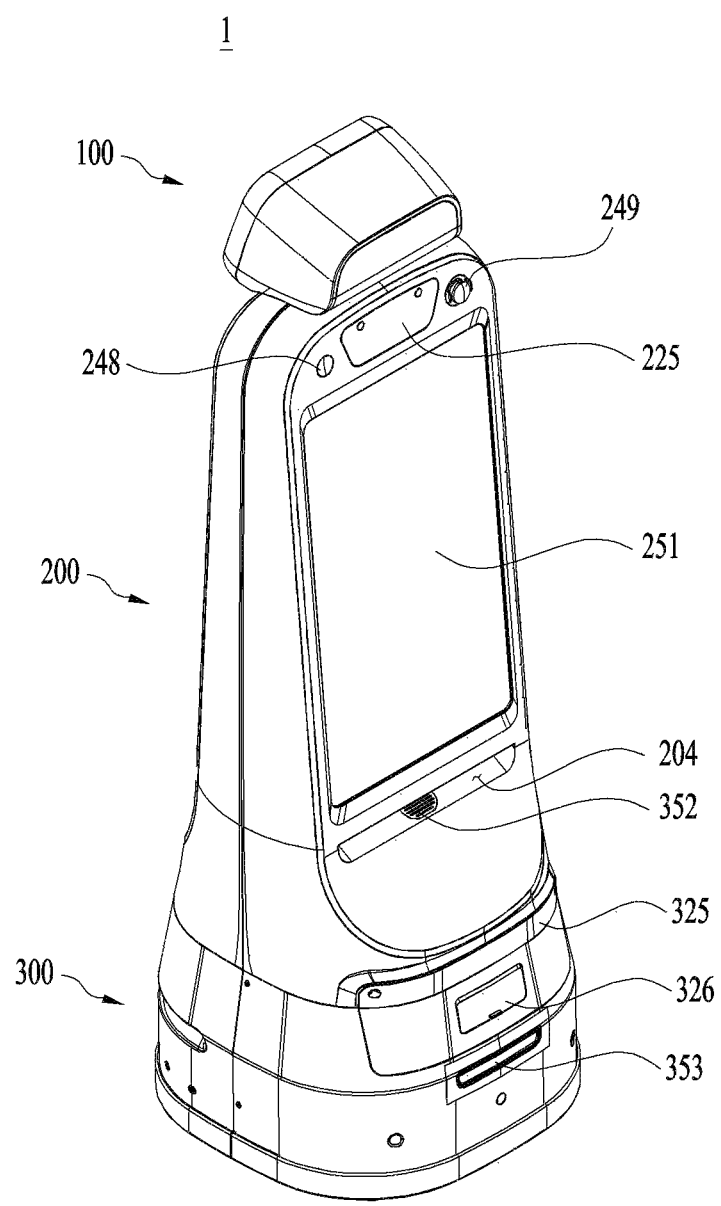
FIG. 2 is a rear perspective view illustrating a mobile robot according to an embodiment of the present disclosure.
Figure 3:
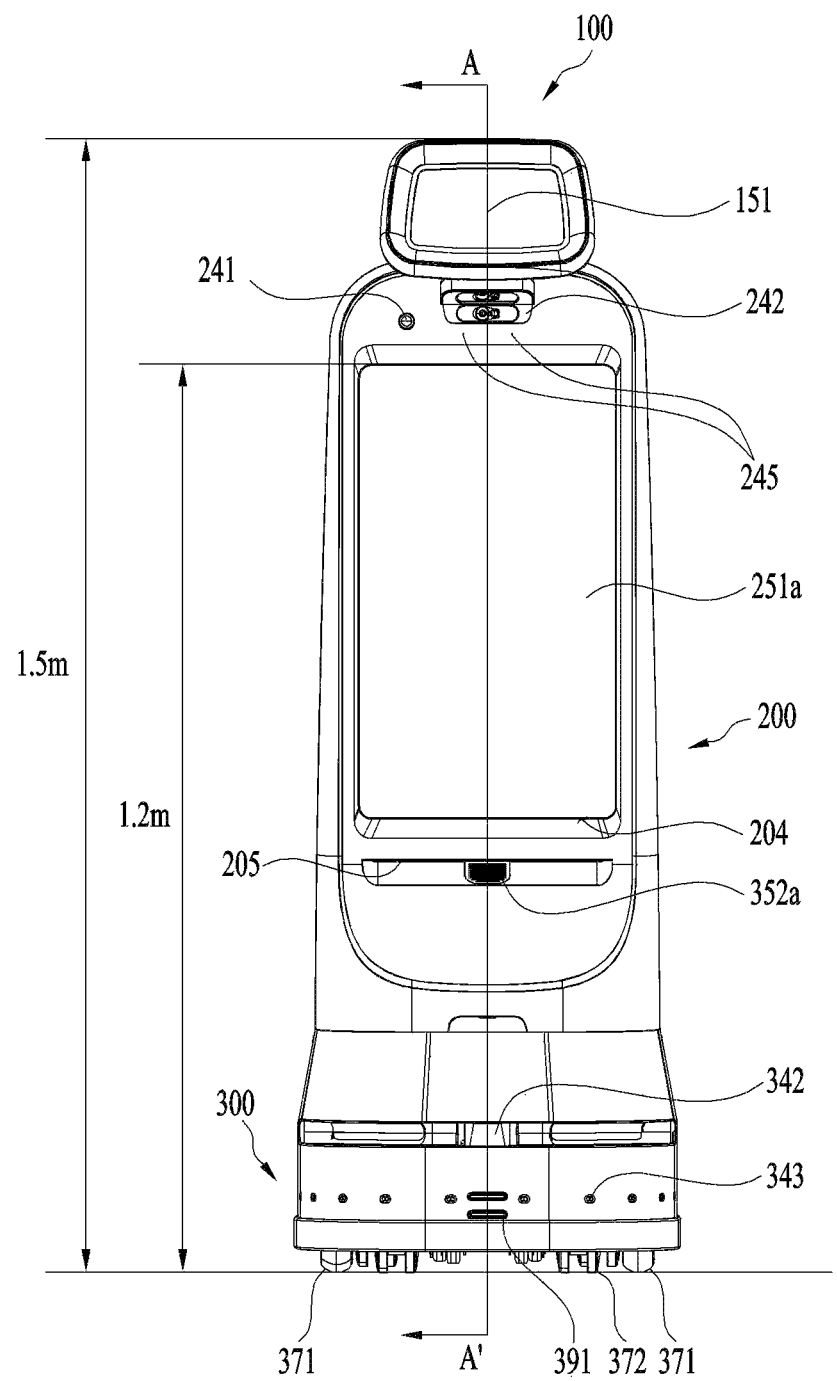
FIG. 3 is a front view illustrating a mobile robot according to an embodiment of the present disclosure.
Figure 4:
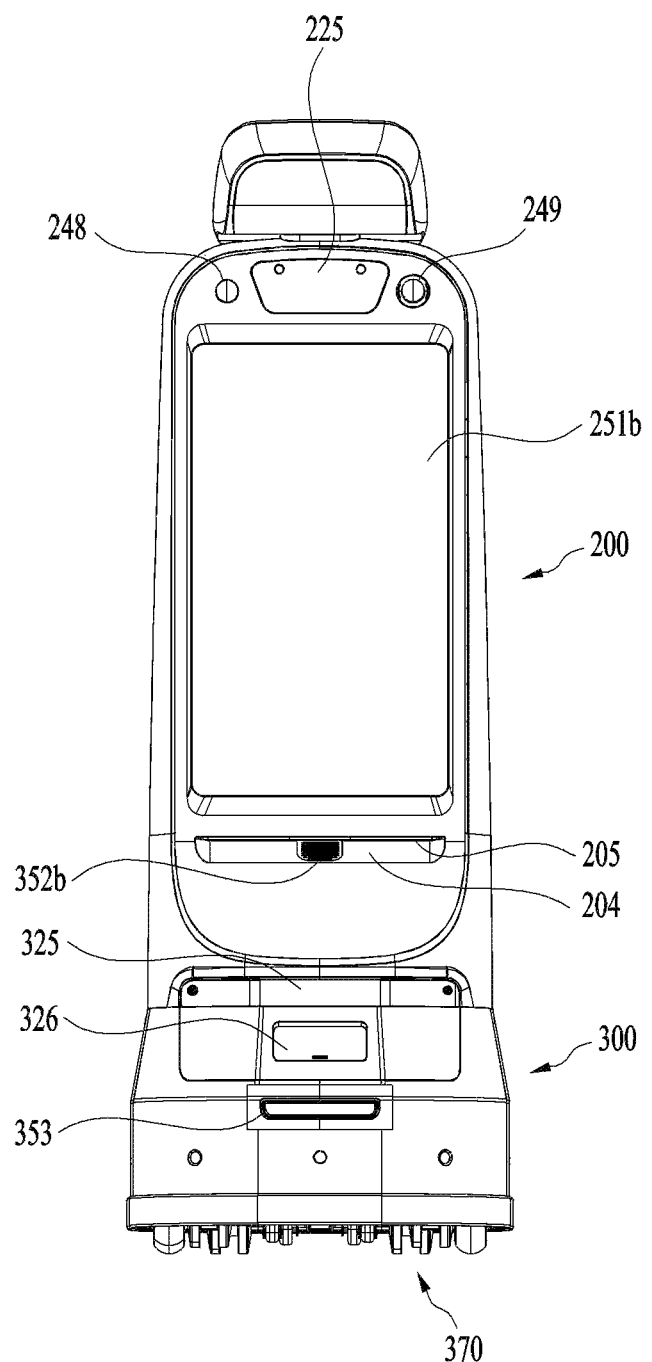
FIG. 4 is a rear view illustrating a mobile robot according to an embodiment of the present disclosure.
Figure 5:
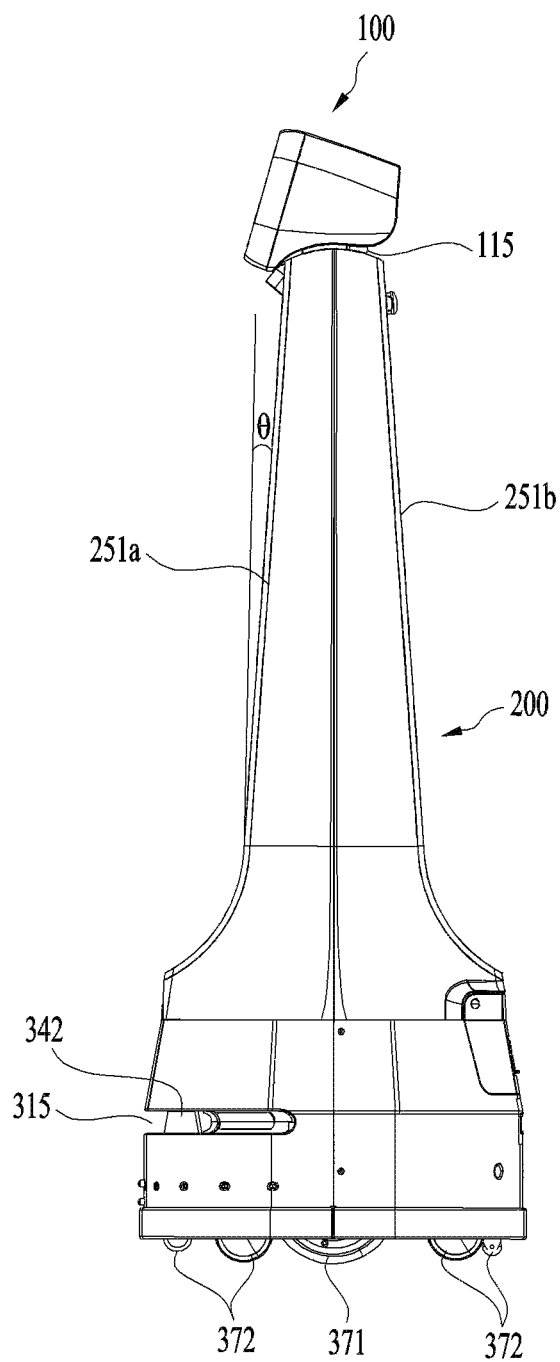
FIG. 5 is a side view illustrating a mobile robot according to an embodiment of the present disclosure.

FIG. 1 is a front perspective view illustrating a mobile robot 1 according to an embodiment of the present disclosure. FIG. 2 is a rear perspective view illustrating the mobile robot 1 according to an embodiment of the present disclosure. FIG. 3 is a front view illustrating the mobile robot 1 according to an embodiment of the present disclosure. FIG. 4 is a rear view illustrating the mobile robot 1 according to an embodiment of the present disclosure. FIG. 5 is a side view illustrating the mobile robot 1 according to an embodiment of the present disclosure.

The mobile robot 1 according to the present disclosure includes a driver 300, and freely moves in public places, so that a user can more easily access the robot and thus the robot can actively provide information desired by the user.

The driver 300 may include a plurality of wheels 371 and 372 as shown in FIGS. 3 and 5. In addition, the driver 300 may include a main wheel 371 disposed at left and right sides of the mobile robot 1 in a manner that the robot 1 can move in forward and backward directions, and may further include a caster 372 configured to freely rotate in the moving direction.

The main wheel 371 is disposed at the left and right sides of the mobile robot 1, and may drive the mobile robot 1 by receiving the driving force of the motor. As shown in FIG. 3, the main wheel 371 may be disposed at both ends (i.e., left and right ends) of the mobile robot 1.

The caster 372 may be disposed before and after the main wheel 371 or may be disposed between one pair of main wheels 371. The caster 372 may maintain balance of the mobile robot 1, and can induce natural movement of the mobile robot 1.

The mobile robot 1 may store map data of the driving place in a memory, may move based on the stored map data. In addition, the mobile robot 1 may additionally receive data from the outside while driving or may update the map data based on data collected through the sensors.

However, even though the map data is provided or constructed, the mobile robot 1 moves in public places with many users so that there are several obstacles that are not in the map data. In addition, an unexpected situation such as suddenly encountering a moving user may occur.

In order to prepare for such obstacles and unexpected situations, the mobile robot 1 may include equipment capable of detecting the surrounding situations such as various sensors 342 and 343 and cameras 241 and 242.

A lidar 342 may be provided in front of the mobile robot 1. A recess 315 may be formed in a front case 310 (see FIG. 7) so that the lidar 342 can be arranged in the front case 310. The recess 315 is formed in a downward direction from the front case 310, and the front end of the recess 315 is opened.

Lidar is a device that emits laser pulses and receives light reflected from the surrounding objects, thereby precisely modeling the surrounding environment. Although the principles of the lidar are similar to those of the radar device, the lidar is designed to use electromagnetic waves different from those of the radar, so that the lidar is different from the radar in terms of use technology and application range.

Since the laser uses light having a wavelength of 600~1000 nm, the laser device may damage human eyesight. The lidar 342 uses a longer wavelength than the wavelength of 600~1000 nm, and may be used to measure the distance to a target object, a moving speed, a moving direction, and a temperature of the target object, as well as to analyze the surrounding atmospheric material and to perform concentration measurement.

Since the lidar 342 can sense a wide range, the recess 315 where the lidar 342 is located may be elongated in a horizontal direction. The lidar 342 can sense an obstacle or a person located in front of the robot through the recess 315.

A plurality of ultrasonic sensors 343 may be provided around the driver 300 at predetermined intervals. The ultrasonic sensor 343 may recognize a nearby object based on a time at which emitted ultrasonic waves are returned and thus determine the distance to the recognized object.

The ultrasonic sensor 343 may be disposed at a lower position than the lidar 342, and the number of ultrasonic sensors 343 may be greater than the number of lidars 342.

A charging terminal 391 for charging the battery 390 (see FIG. 6) may be provided outside the driver. As can be seen from the drawings, the charging terminal 391 is located at the front lower end of the mobile robot 1, but the installation position of the charging terminal 391 is not limited thereto. A charging cable may be manually connected to the charging terminal 391, and the robot may move and dock with a power terminal located at the charging cradle so that the robot may be charged with electricity.

Displays 251a and 251b provided in a body 200 may be provided on the front and rear surfaces, respectively. One pair of displays 251a and 251b may be provided in the robot so that the user can simultaneously obtain necessary information from both sides of the robot. As a result, the robot can deal with the user through the front surface thereof, and at the same time can output information such as words of guidance through a back surface thereof.

As shown in FIG. 5, a lower portion of the display 251 may protrude upward from the bottom surface of the robot, so that the display 251 may be inclined at a predetermined angle (θ, for example, 4°).

As shown in FIG. 3, the height (e.g., 1.5 m) of the mobile robot 1 is smaller than that of a normal adult, and the display 251 of the body is located at a lower position (e.g., 1.2 m) than the mobile robot 1. Therefore, in order for the user to view the display 251 at the eye level of an adult, the user can more easily use the mobile robot 1 in a situation where the display 251 is slightly inclined.

Speakers 352 may be provided at lower ends of the displays 251. Since the robot includes one pair of displays 251, one speaker 352a may be provided at the front surface of the robot and the other speaker 352b may be provided at the rear surface of the robot.

Conventionally, in order to arrange the display 251 at the user's eye level, the speaker 352 of the conventional mobile robot 1 is disposed in a side direction. In contrast, the mobile robot 1 according to the present disclosure is configured in a manner that the speaker 352 is disposed at the same surface as the display 251, so that sound can be directly delivered to the user.

When the speaker 352 is disposed at a lower portion of the robot, the speaker 352 may be arranged so that sound is obliquely emitted toward ears of the user. The speaker 352 obliquely arranged toward the user's ears can directly transfer sound to the user, thereby reducing user inconvenience caused by the robot moving in a noisy public place.

Various cameras 241 and 242 may be disposed at an upper portion of the body 200. The cameras may be located under the head 100, and the camera may include a plurality of cameras having different functions, such as an RBGD camera or a depth camera.

Depending on various types of cameras, the above-described cameras may include cameras capable of obtaining information necessary for robot driving, and other cameras capable of recording the situation in public places such as CCTV.

A microphone 245 may be provided at a lower portion of each of the cameras 241 and 242. The microphone 245 is disposed at a position slightly lower than the position of the user's mouth, and may recognize the user request by recognizing the user's voice. The microphone 245 may be implemented as a plurality of microphones for accurate voice recognition. In this embodiment, one pair of microphones may be provided at the front surface of the robot.

A second repair cover 325 required for repairing a control box 380, etc. located in the driver 300 may be provided at the rear surface of the robot. A first repair cover 225 required for repairing the display 251 provided in the body 200 may be disposed at an upper portion of the body 200, so that the inside of the body 200 can be opened through the first repair cover 225 for separation of the head 100.

In addition, the robot may include physical buttons required for performing a specific function, such as an emergency stop button or a brake release button. As can be seen from the drawings, the physical buttons may be disposed at an upper portion of the display 251, the scope or spirit of the present disclosure is not limited thereto, and it should be noted that the physical buttons may be disposed at the head 100 or may also be disposed in the side direction.

The head 100 may be disposed at the upper portion of the body 200, and may be coupled through a neck portion 115. The neck portion 115 is formed thinner than the head 100 in a similar way to a human neck, so that the mobile robot 1 can be recognized as a humanoid as needed.

The head 100 may include the display 151 disposed at the front surface of the robot. The head 100 is smaller in size and lighter in weight than the display 251 of the body 200, so that the neck portion can be prevented from being damaged due to the weight of the head 100.

Facial images of various expressions may be output to the head 100, or the user may directly input notification messages through the head 100 as necessary. Important notification messages may be output to the display of the head 100.

Figure 6:
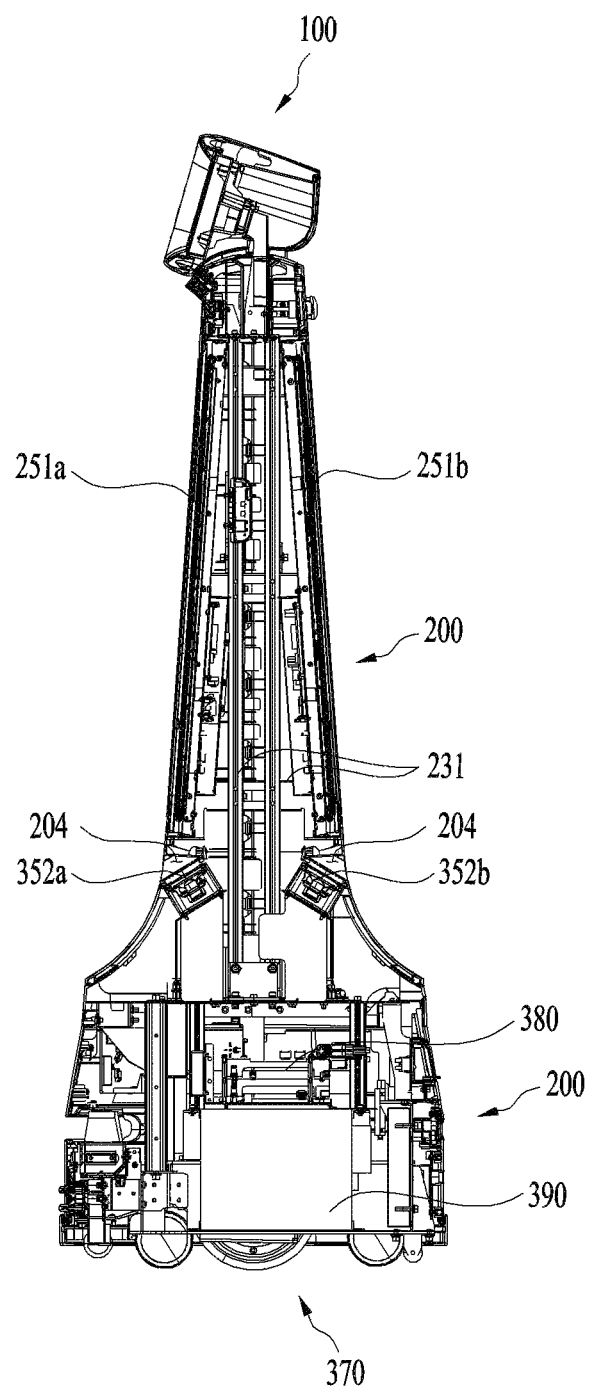
FIG. 6 is a cross-sectional view illustrating a mobile robot taken along the line A-A' of FIG. 3.

FIG. 6 is a cross-sectional view illustrating the mobile robot taken along the line A-A of FIG. 3. In the body 200, a first profile 231 vertically extending to support the display 251 disposed at the front and rear surfaces may be disposed at the center of the body 200, and the display 251 may be fastened to both sides of the first profile 231. The speaker 352 disposed at the lower portion of the display 251 is inclined upward and the driver 300 disposed at the lower portion of the robot may include a traveling unit 370, a power-supply unit 390, and a controller 380.

The traveling unit 370 in contact with the floor may include a plurality of wheels, and the power-supply unit 390 disposed over the traveling unit 370 may include a battery 390. Preferably, the battery 390 having a weight may be disposed at a lower portion of the mobile robot so that the mobile robot 1 can stably travel or move.

The control box 380 serving as the controller 380 may be disposed over the battery 390, and the control box 380 may include a plurality of printed circuit boards (PCBs) and an integrated circuit (IC) mounted thereon. The control box 380 is connected to a sensor, cameras 251, the speaker 352, etc. mounted on the mobile robot 1, and may include a wireless communication unit 361 for connection to the server or the mobile base station.

If the head 100 disposed at the upper portion of the body 200 is too heavy, there is a risk that the robot will overturn while driving so that the head 100 can be configured to be as light as possible. The head 100 may be fixed to the upper portion of the body 200 through a head bracket 115 inserted into the body 200.

Constituent elements of the mobile robot 1 will hereinafter be described with reference to the exploded perspective views shown in FIGS. 7 to 12.

Figure 7:
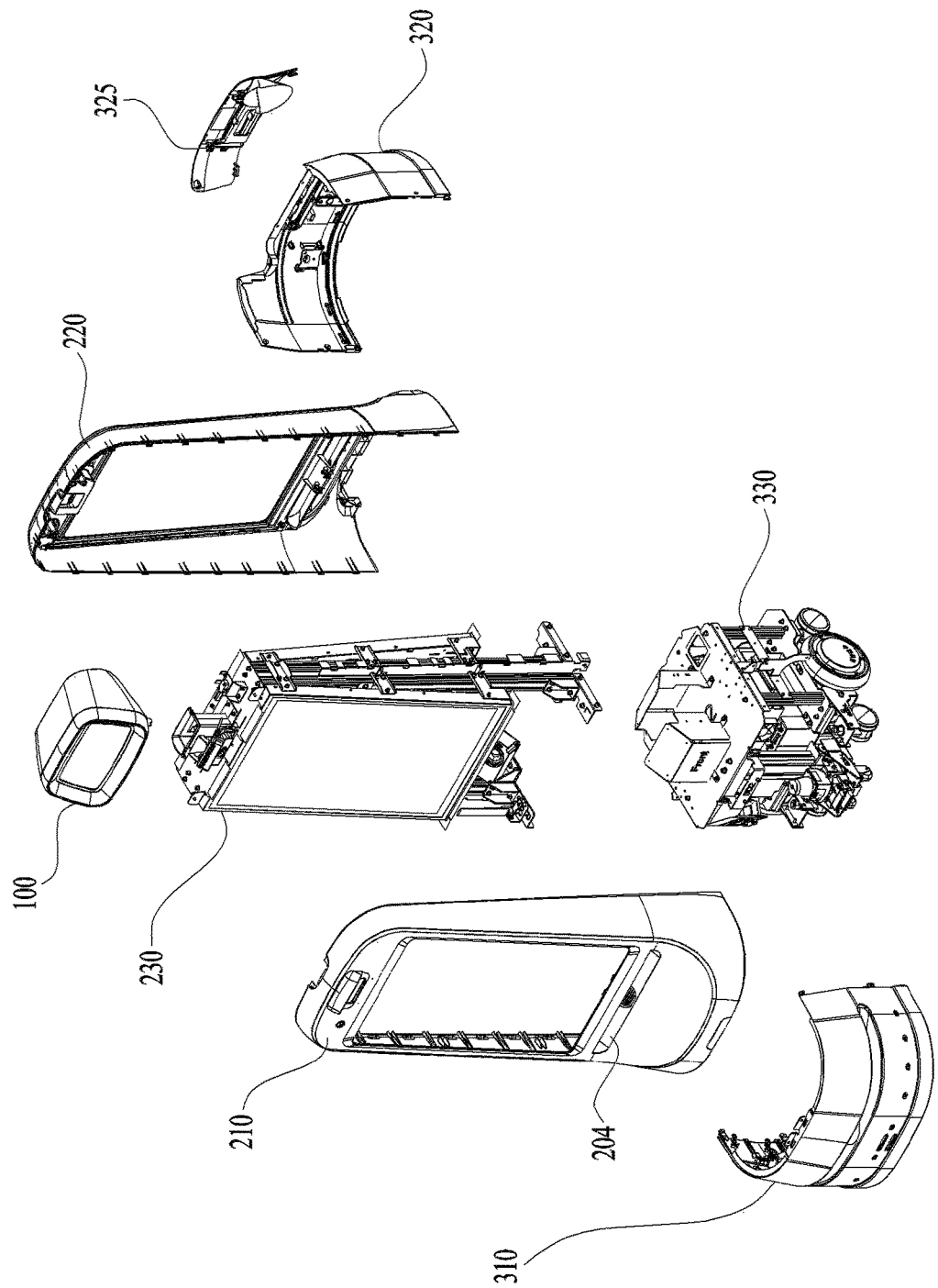
FIG. 7 is an exploded perspective view illustrating a mobile robot according to an embodiment of the present disclosure.

FIG. 7 is an exploded perspective view illustrating the mobile robot 1 according to an embodiment of the present disclosure.

Referring to FIG. 7, the driver 300 may include a driver front case 310, a driver rear case 320, and a driver frame 330 disposed between the driver front case 310 and the driver rear case 320. The driver frame 330 may include a traveling unit 370, a power-supply unit 390, and a controller 380. A speaker bracket 3521 extending to the body 200 may be disposed at the top surface of the driver frame 330.

The body 200 may include a body front case 210 constituting the front surface of the body 200, a body rear case 220 constituting the rear surface of the body 220, and a body frame 230 mounted in a space formed between the body front case 210 and the body rear case 220.

The body frame 230 is fastened to a top surface of the driver frame 330 disposed at a lower portion of the mobile robot, and may include the display 251 disposed at the front and rear surfaces of the driver frame 330. An opening may be formed at a portion corresponding to the display 251 in each of the driver front case 310 and the driver rear case 320. In addition, the speaker 352, a sound hole 203 for a vent, and a vent hole may be disposed at a lower portion of each of the driver front case 310 and the driver rear case 320.

The head 100 is fastened to the body frame 230, and may include a display 151 on the front surface thereof. The mobile robot 1 according to the present disclosure can be configured such that the number of constituent elements of the head 100 is minimized and the center of gravity of the mobile robot 1 is located at a lower portion of the mobile robot 1.

In addition, the coupling structure of the head 100 is simplified, so that the head 100 can be easily replaced with another and the function of the mobile robot 1 can be expanded and changed.

Figure 8:
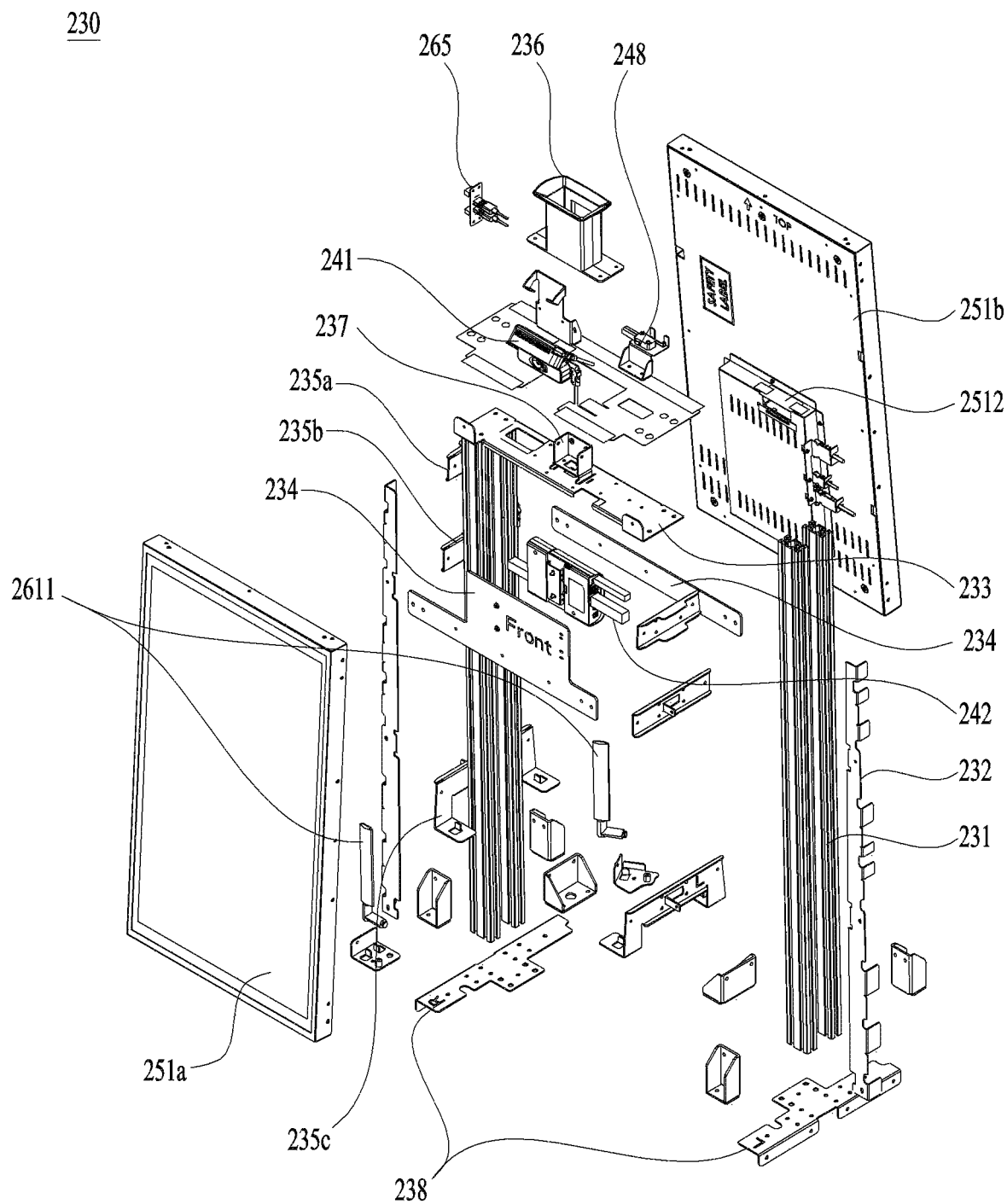
FIG. 8 is an exploded perspective view illustrating a body frame of a mobile robot according to an embodiment of the present disclosure.

FIG. 8 is an exploded perspective view illustrating a body frame 230 of the mobile robot 1 according to an embodiment of the present disclosure. The body frame 230 may include the first profile 231 extending in a vertical direction.

The profile 231 is a bar-shaped steel material having an empty space therein, and may compensate for rigidity through bending or unevenness while reducing the weight thereof through the inner space thereof. The profile 231 may be made of a material that is light and easy to process, such as aluminum.

The profile 231 may be manufactured by extrusion to have a desired length, thickness, and shape. When a groove is formed on the outer surface of the body frame by forming irregularities in the cross section of the profile 231, a groove extending in the longitudinal direction may be formed, and this groove can be used as a rail.

In this embodiment, in order to secure sufficient rigidity and support one pair of displays 251, a total of four first profiles 231 extending in a vertical direction may be disposed at the left and right sides of the body frame 200. In more detail, one pair of the first profiles 231 may be disposed at the left side of the body frame 200 and the other pair of first profiles 231 may be disposed at the right side of the body frame 200, so that a total of four first profiles 231 can be disposed at the left and right sides of the body frame 200.

The first profile 231 is fastened to the driver frame 330 through the bottom plate 238 located at a lower portion of the robot, and the first profile 231 may further include an upper reinforcement frame 234 that prevents the first profiles 231 from being inclined through connection of the left and right first profiles 231.

Since the display 251 is inclined at a predetermined angle θ, the display 251 may be connected to the first profile 231 through the display support 235 without being directly coupled to the first profile 231.

The display support 235 is coupled to the first profiles 231 disposed at the left and right sides so that the display support 235 can extend in forward and backward directions.

The upper display support 235a disposed at the upper portion of the body frame 230 in response to the inclined shape of the display 251 may be shorter in length than the lower display support 235c.

The first profile 231 is fastened to the center portion of the display support 235, and both ends of the display support 235 are fastened to the front display 251 and the rear display 251. The lower display support 235c located at the lower portion of the body frame 230 may include a support portion 2355 (see FIG. 14C) for supporting the lower portion of the display 251.

Further, side reinforcement frames 232 may be disposed at the left and right sides of the body frame 230, respectively.

The side reinforcement frames 232 may be fastened and fixed to the first profile 231 or the display support 235.

Each of the side reinforcement frames 232 may include a plurality of protrusions, and may be fastened to the front case of the body 200 or the rear case of the body 200.

An antenna 2611 for wireless communication may be disposed in the body 200. In the present embodiment, although the antenna 2611 is illustrated as being disposed below the body 200 so as to be fixed to the upper portion of the driver frame 330, the antenna 2611 may also be disposed above the body 200.

A camera module such as an RGBD camera 241 or a security camera 242 may be disposed over the body 200, and the microphone 245 and user input units 248 and 249 may also be disposed over the body 200.

The user input unit, such as the emergency button 249 or the brake lock/release switch 248, used or frequently used in crisis situations may be installed at a height easily accessible by the user.

The cameras 241 and 242, the microphone 245, the user input unit, etc. may be disposed over a top plate 233, and the top plate 233 may be fastened and fixed to an upper portion of the first profile 231.

The upper portion of the body 200 may include an inner cover 236 and a USB port 265 coupled to the head 100. The head bracket 115 of the head 100 may be inserted into the inner cover 236, and the cable extending along the head bracket 115 may be connected to the USB port so that the cable can be connected to the control box 380 disposed in the driver 300.

A display PCB 2512 for controlling each pixel of the display 251 may protrude toward the rear surface of the display 251, as shown in FIG. 8.

Since the display 251 is mounted in the body 200 so that the lower portion of the display 251 is formed to protrude, the display PCB 2512 can be disposed to be biased toward the lower portion of the display 251.

Figure 9:
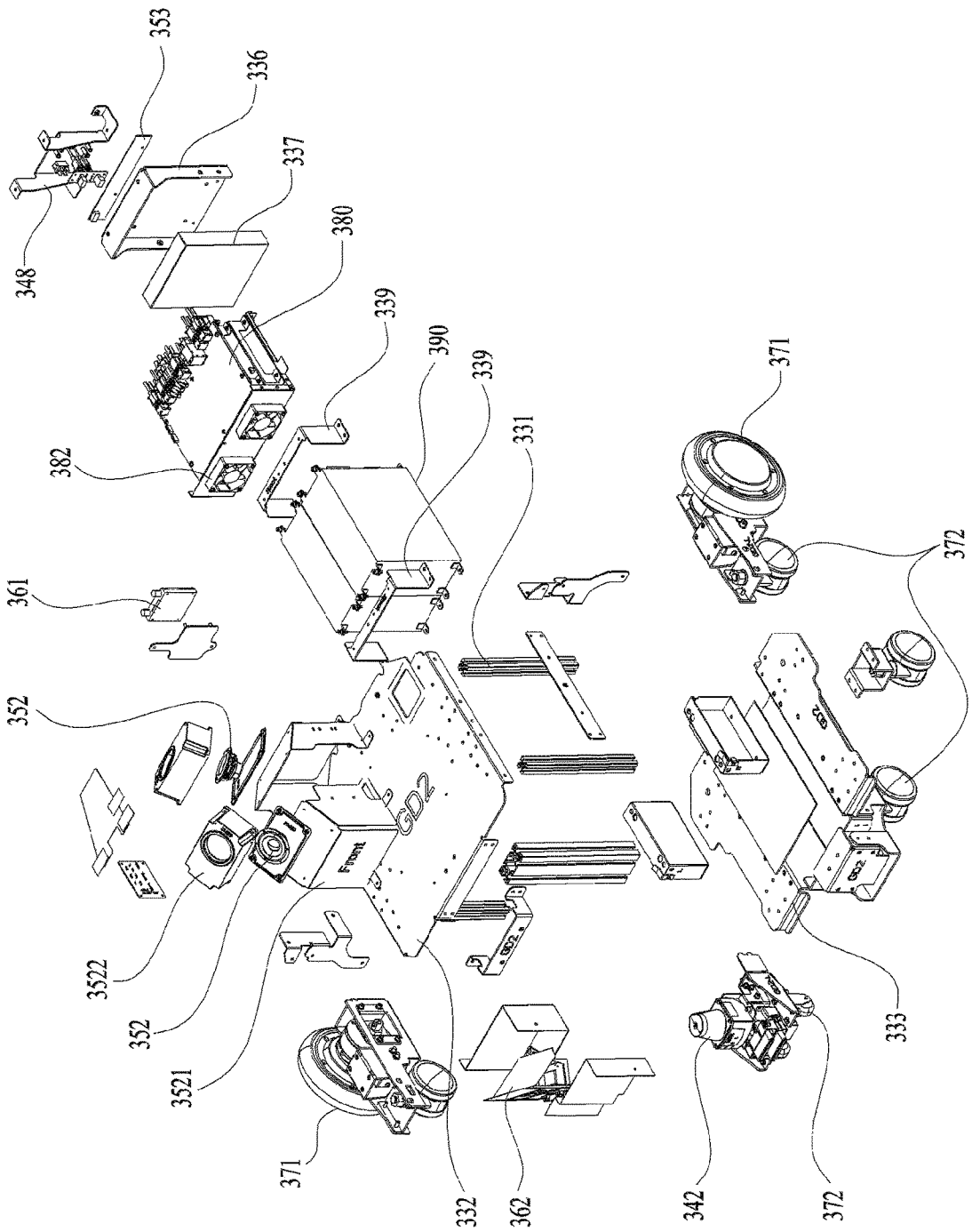
FIG. 9 is an exploded perspective view illustrating a driver frame of a mobile robot according to an embodiment of the present disclosure.

FIG. 9 is an exploded perspective view illustrating the driver frame 330 of the mobile robot 1 according to an embodiment of the present disclosure.

Referring to FIG. 9, the driver 300 may include a traveling unit 370 configured to have wheels and a motor, a power-supply unit 390 disposed over the traveling unit 370, a controller 380 disposed over the power-supply unit 390, and an upper plate 332 fastened to the body 200.

The driver 300 may include a plurality of second profiles 331 extending in the vertical direction for rigidity, and may be disposed between the lower plate 333 and the upper plate 332, resulting in formation of a support structure.

In the traveling unit 370 disposed below the lower plate 333, main wheels 371 connected to the motor can be located at the left and right sides of the driver frame 330.

A plurality of casters 372 may be further provided in forward, backward and inner directions of the main wheels 371 to support the entire weight of the mobile robot 1 and maintain balance.

The battery 390 may be disposed under the mobile robot 1 and may be fixed to the lower frame 333 through a battery fixing bracket 339. In order to adjust the weight of the mobile robot 1 moving in the forward and backward directions, a separate weight 337 may be provided at the rear of the battery 390.

The LED 353 or the rear switch 348 exposed to the rear case 320 of the driver may be disposed on the rear frame 336 located in the backward direction.

The lidar 342 may be disposed in front of the battery 390. In addition to the lidar 342, the charging terminal 391 exposed to the driver front case 310 or the caster 372 located in the forward direction may be modularized and coupled to the front surface of the lower frame 333.

The control box 380 serving as the controller 380 may be disposed over the battery 390, and may include a plurality of substrates and a plurality of ICs mounted thereon.

The controller 380 may be connected to the battery 390, the sensor, the cameras 241 and 242, etc. to collect necessary information, and may control the motor of the traveling unit 370 based on the collected information, so that the mobile robot 1 can move while avoiding collision with obstacles.

In addition, the robot may receive requirements of the user through the microphone 245, the touch sensor, and the like, and may be controlled to output information required for the display 251.

The controller 380 may include a connector to be coupled to each constituent component. In addition, since the IC of the controller 380 emits heat, the controller 380 includes a cooling fan 382 for heat dissipation.

The mobile robot may further include a wireless communication module 361. The wireless communication module 361 may be mounted on the control box or may be implemented as a separate module. The antenna (e.g., a Wi-Fi module 362) connected to the wireless communication module 361 may be disposed adjacent to the outer direction of the mobile robot 1.

Although the speaker 352 is disposed over the body 200, the speaker 352 may be seated on the upper plate 332 of the driver 300. The speaker bracket 3521 protrudes from the upper plate 332 toward the body 200, and the speaker 352 may be disposed inside the sound hole 203.

The upper portion of the speaker bracket 3521 may include an inclined surface 202, and the speaker 352 may be obliquely inclined in the upward direction from the side direction.

The driver frame 330 may further include a speaker cover 3522 to prevent foreign substances from flowing into the speaker 352. The speaker cover 3522 may include a waterproof film 3523 to prevent water from flowing into the speaker 352.

Figure 10:
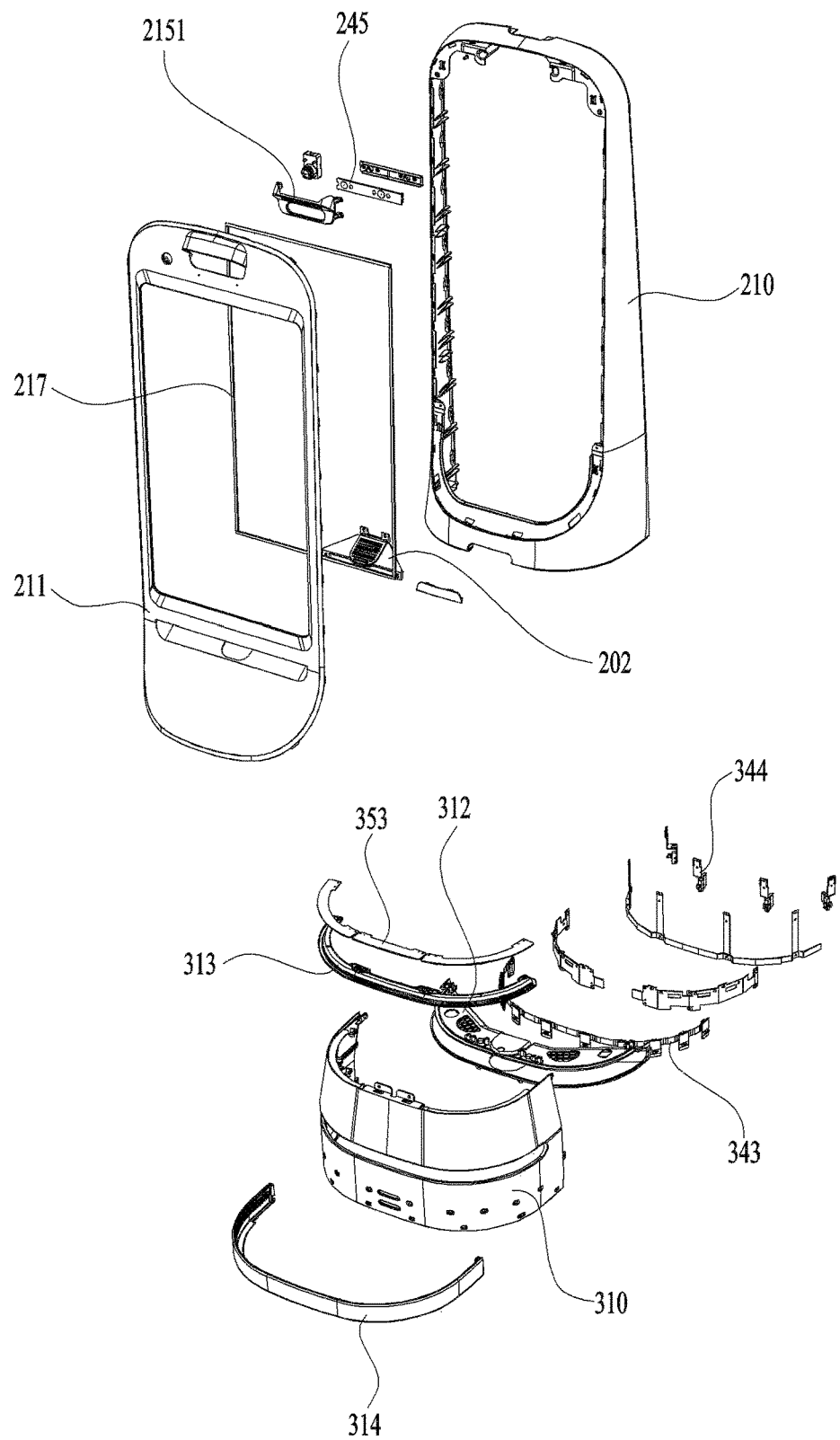
FIG. 10 is an exploded perspective view illustrating a front case of a mobile robot according to an embodiment of the present disclosure.

FIG. 10 is an exploded perspective view illustrating front cases 210 and 310 of the mobile robot 1 according to an embodiment of the present disclosure. Referring to FIG. 10, the mobile robot 1 may include the body front case 210 for covering the front surface of the body 200, and the driver front case 310 for covering the front surface of the driver 300.

In the present embodiment, two front cases 210 and 310 are configured to be separated from each other, or may be configured as an integrated body.

An opening through which the display 251 is exposed outside may be formed at the front surface of the body front case 210, and a front decoration 211 for covering the circumference of the display 251 may be further provided in the body front case 210.

The display 251 may be exposed to the outside through an opening or a transparent portion formed in the front decoration 211. A display fixing pad 217 may be disposed between the front decoration 211 and the display 251 to protect and fix the display 251.

The front decoration 211 may include an opening in which the display 251, the microphone 245 or the cameras 241 and 242 are disposed. A camera mounting portion may have a shape protruding from the front decoration 211, and an opening may be formed in the front decoration 211 so that the camera 241 can be disposed in the front decoration 211. The camera decoration 2151 covers the camera to fix the camera 241, and may be disposed in the opening of the camera of the front decoration 211.

The front case 310 of the driver 300 may include a recess 315 (see FIG. 5) longitudinally formed for arrangement of the lidar 342 of the driver 300, and the lidar 342 may be disposed in the recess 315. The decoration of the covering lidar 342 may further include a region other than a portion where the lidar 342 is located.

The ultrasonic sensor 343 may be attached to the inside of the driver front case 310, and the driver front case 310 may include a plurality of holes through which the plurality of ultrasonic sensors 343 is exposed outside.

Since there is a high possibility that the lower portion of the mobile robot 1 collides with obstacles during movement of the mobile robot 1, a bumper 314 formed of an elastic material such as silicone may be provided along the circumference of the front surface of the mobile robot 1, and may be located below the ultrasonic sensor 343.

A bumper switch 344 may be provided inside the bumper 314 to sense the impact applied to the bumper 314, and a hole may be formed in the driver front case 310 for arrangement of the bumper switch 344.

Separately from the display 251 of the body 200, the driver 300 may include the LED 353 as a light source for displaying the state of the mobile robot 1, and the LED 353 and the LED diffusion cover 313 may be disposed along the circumference of the lidar decoration 312.

Figure 11:
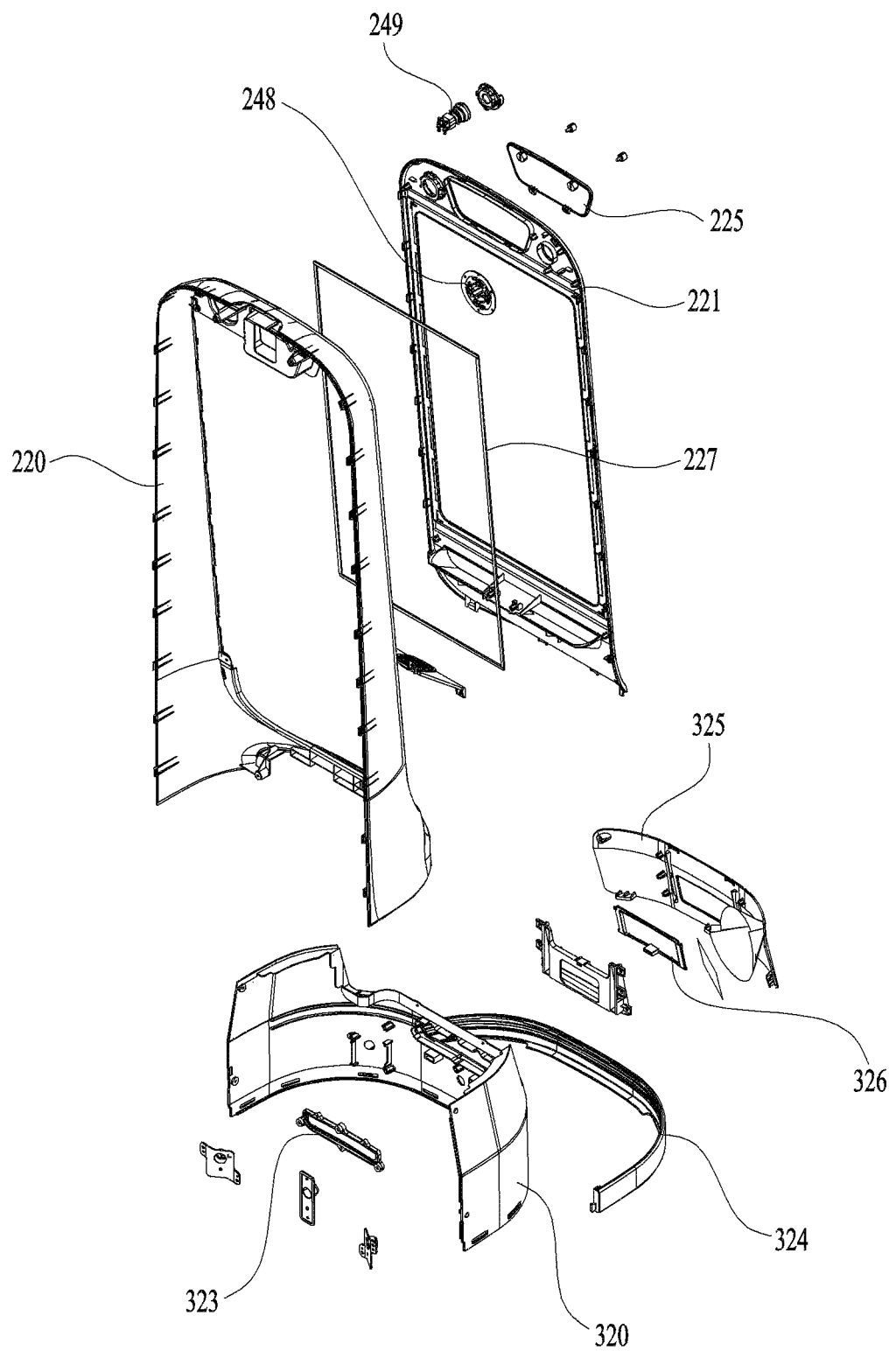
FIG. 11 is an exploded perspective view illustrating a rear case of a mobile robot according to an embodiment of the present disclosure.

FIG. 11 is an exploded perspective view illustrating the rear cases 220 and 320 of the mobile robot 1 according to an embodiment of the present disclosure.

Since the display 251 is disposed on the rear surface as well as the front surface of the mobile robot, the mobile robot may include the rear decoration 221 for covering the display 251 and a display fixing pad 227 disposed between the rear decoration 221 and the display 251.

The user input unit such as an emergency stop button 249 or a brake release switch 248 may be located at the rear surface of the mobile robot 1, and may be disposed at an upper side of the display 251, so that the rear decoration 221 may include an opening for arranging the user input unit.

In order to perform fastening, separation, and repairing of the head 100, the mobile robot may further include the first repair cover 225 formed to be opened (224). Here, the first repair cover 225 may be formed of the same material as the rear decoration 221, so that the first repair cover 225 may be integrally formed with the rear case 220.

The rear case 320 of the driver may include a bumper 324, like the front portion, and the bumper 324 may be configured with the same thickness and material as the front bumper 314 to implement a continuous design. The driver rear case 320 may also include the LED 353 as a display unit and may include a diffusion cover 323.

Since the driver 300 includes the control box 380, the driver 300 may further include a second repair cover 325 for allowing the user to easily access the control box 380 for maintenance. The second repair cover 325 may be fastened through bolts or the like, and may further include a switch cover 326 that can be easily opened and closed by the user who desires to turn the power switch 348 on or off. The switch cover 326 may include a magnet or a hook, so that the switch cover 326 can be easily opened and closed through the magnet or the hook.

Figure 12:
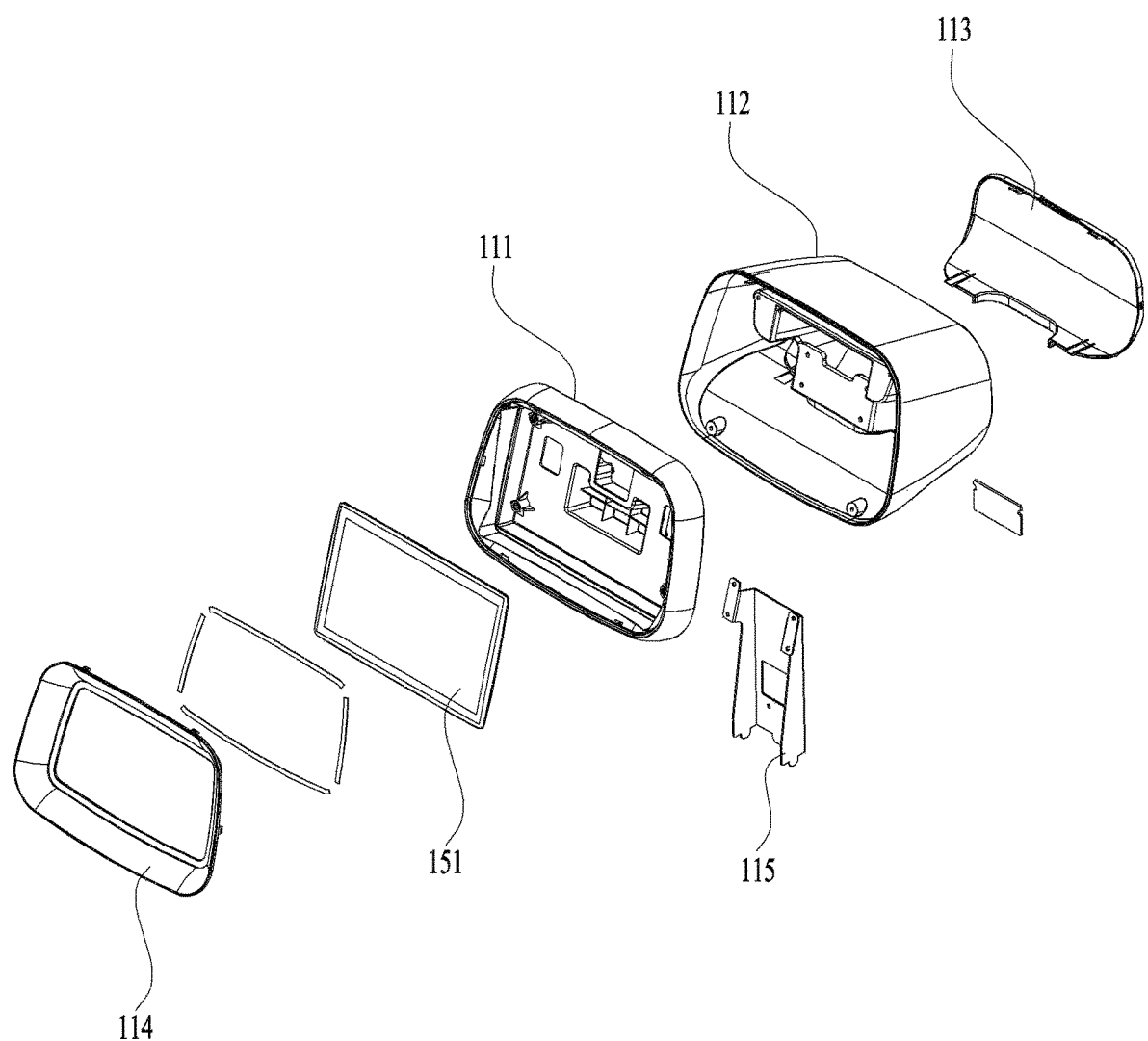
FIG. 12 is an exploded perspective view illustrating a head of a mobile robot according to an embodiment of the present disclosure.

FIG. 12 is an exploded perspective view illustrating the head 100 of the mobile robot 1 according to an embodiment of the present disclosure. Referring to FIG. 12, the head 100 may include a head front cover 111 in which the head display 151 is seated, a head central cover 112 to which the head bracket 115 fastened to the body 200 is fixed, and a head rear cover 113 coupled to the rear surface of the head central cover 112 so that the rear surface of the head 100 can be opened.

The head display 151 may be seated in the head front cover 111, may cover the front circumference of the head display 151, and may include a head decoration 114 for fixation of the head display 151.

The upper end of the head bracket 115 may be coupled to the central cover 112 and the lower end of the head bracket 115 is inserted into the body 200 so that the head bracket 115 is fixed to the body 200. In this case, the head bracket 115 may be bent in a U-shape so that a space 1154 surrounded by the head bracket 115 can be secured.

The cable 116 (see FIG. 18A) for connecting the electronic component of the head 100 to the body 200 may be formed to pass through the space 1154 surrounded by the head bracket 115.

Figure 13:
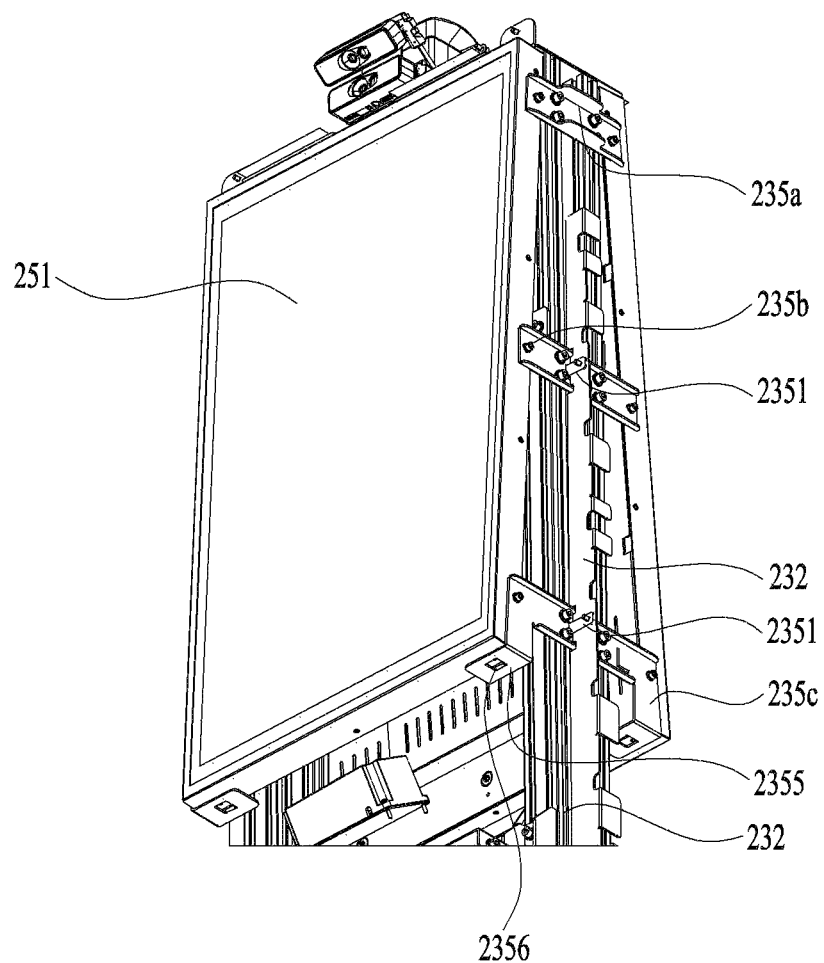
FIG. 13 is a partial perspective view illustrating a body frame of a mobile robot according to an embodiment of the present disclosure.

FIG. 13 is a partial perspective view illustrating the body frame 230 of the mobile robot 1 according to an embodiment of the present disclosure. FIG. 13 illustrates a display support 235 for fixing the front display 251 and the rear display 251 to the first profile 231.

Referring to FIG. 13, although the display support 235 is shown as having a total of six display supports 235 in the vertical direction for convenience of description, the scope of the present disclosure is not limited thereto, and the display support 235 may also include at least six display supports 235 as needed. In more detail, the six display supports 235 may be three pairs of display supports 235 arranged in the vertical direction, and each of the three pairs of display supports 235 includes two display supports 235 in which one display support 235 is disposed at the left side and the other display support 235 is disposed at the right side. As the display 251 increases in size, many more display supports 235 can also be used as needed.

In order to increase the usability of the display 251, the display 251 has an upper portion that is inclined by about 4° in the backward direction, so that the upper display support 235a may be shorter in length than the middle display support 235b or the lower display support 235c.

Figure 14A:
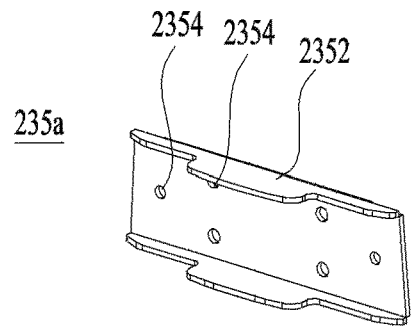
FIGS. 14A-14C are perspective views illustrating display supports of a mobile robot according to an embodiment of the present disclosure.
Figure 14B:
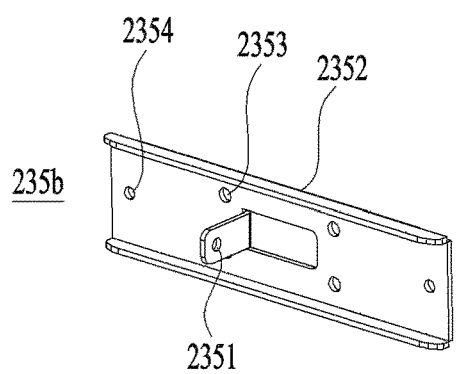
Figure 14C:
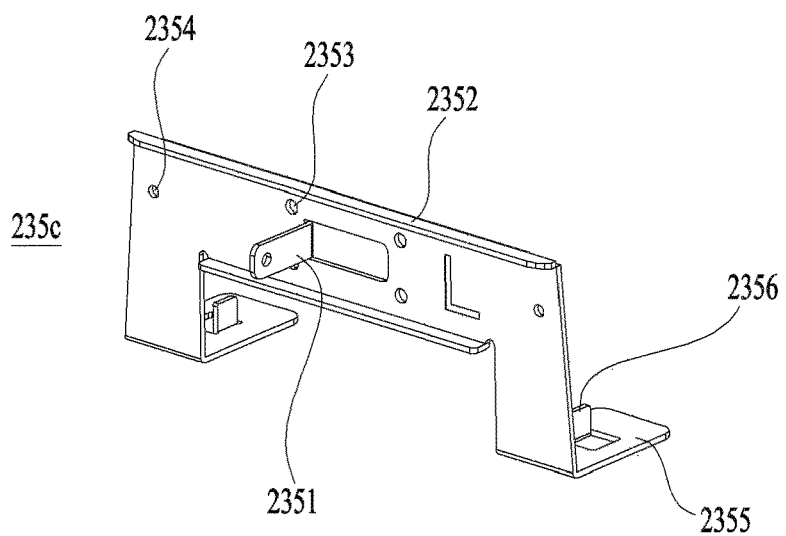

FIGS. 14A-C are perspective views illustrating display supports 235 of the mobile robot 1 according to an embodiment of the present disclosure. FIG. 14A illustrates the upper display support 235a, FIG. 14B illustrates the middle display support 235b, and FIG. 14C illustrates the lower display support 235c.

In each of the above-described three supports 235a, 235b, and 235c, a fastening hole 2353 fastened to the first profile 231 may be disposed at the center portion, and a fastening hole 2354 fastened to the display 251 may be disposed at both ends. Each of the upper and lower portions of the display support 235 may be bent (2352), resulting in an increase in rigidity.

Each of the middle display support 235b and the lower display support 235c may include a wing portion 2351 at the center portion thereof. The wing portion 2351 may be a portion required for fastening other members, such as the side reinforcement frame 232, as shown in FIG. 13.

The wing portion 2351 may be bent by cutting a portion of the display support 235. The casing of the body 200 may be fastened to the side reinforcement frame 232, and may be arranged perpendicular to the surface of the display support 235.

The lower display support 235c may include a support portion 2355 to support the lower portion of the display 251. The lower display support 235c may be bent to form the support portion 2355, and the support portion 2355 may include a protrusion 2356 coupled to the lower end of the display 251. The support portion 2355 may support the load of the display 251 so that the display 251 can be more firmly fixed.

Figure 15A:
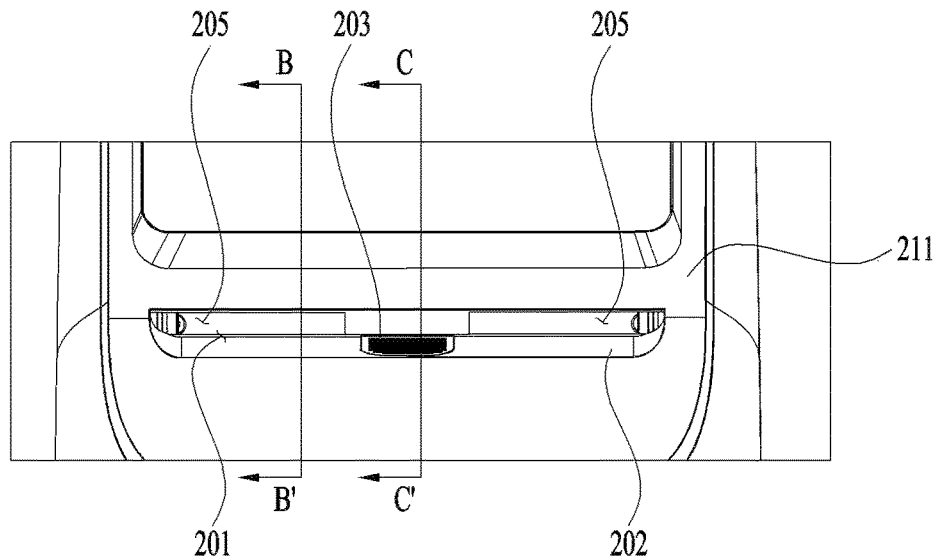
FIG. 15A is a front view illustrating a vent hole and a speaker of the mobile robot according to an embodiment of the present disclosure.
Figure 15B:
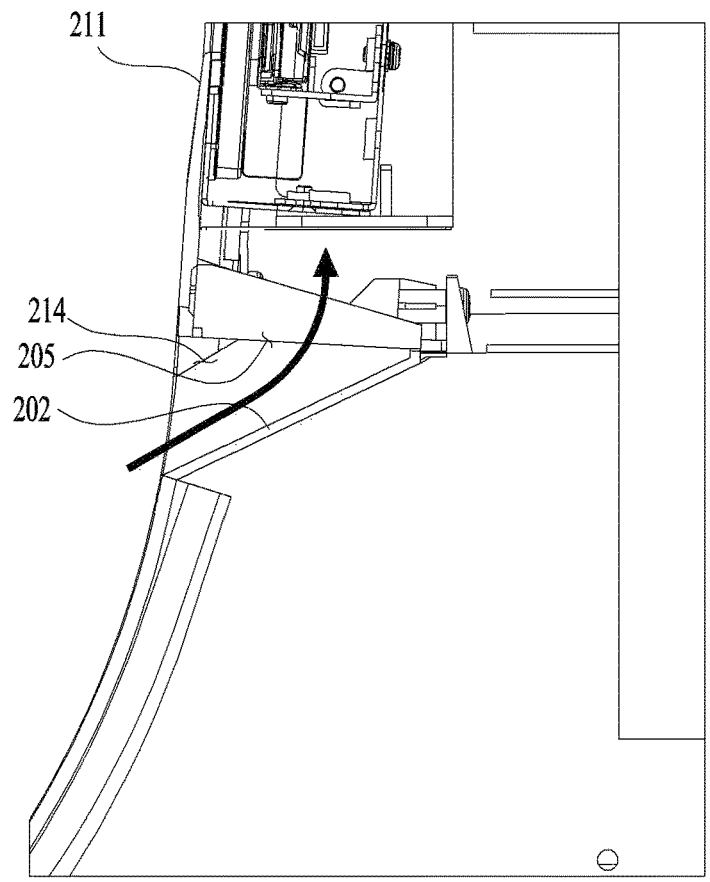
FIG. 15B is a cross-sectional view illustrating the vent hole and the speaker of the mobile robot according to an embodiment of the present disclosure.

FIG. 15A is a front view illustrating the vent hole 205 and the speaker 352 of the mobile robot 1 according to an embodiment of the present disclosure, and FIG. 15B is a cross-sectional view illustrating the vent hole 205 and the speaker 352 of the mobile robot 1 according to an embodiment of the present disclosure. In more detail, FIG. 15A is a diagram illustrating only the vent hole 205 disposed below the display 251, and FIG. 15B is a cross-sectional view illustrating the mobile robot taken along the line B-B' of FIG. 15A.

The mobile robot 1 may include electronic components such as the display 251, the battery 390, and the control box 380, etc. and may emit heat. When the temperature of the mobile robot 1 greatly increases, performance of the mobile robot 1 may be deteriorated, so that there is a need to cool the mobile robot 1.

The control box 380 disposed in the driver 300 may include an integrated circuit (IC) that generates a large amount of heat, so that the control box 380 can actively emit heat using a separate cooling fan 382 (see FIG. 9).

On the other hand, the display disposed in the body 200 may emit a smaller amount of heat than the control box 380. Therefore, when a separate fan is provided in the body 200, the mobile robot is inefficient in operation and has noise problems.

Therefore, heat generated from the body part 200 that does not generate much heat may be discharged using the vent hole 205. Although the mobile robot does not have a device for actively circulating air like a fan, the vent hole 205 may be formed at the front and rear surfaces of the mobile robot 1 in a manner that air can be naturally introduced into the vent hole 205 during driving of the mobile robot 1, so that heat can be more effectively discharged outside.

As shown in FIG. 15B, air may be introduced into the vent hole 205 formed in the traveling direction, and air inside the body 200 may be discharged to the other vent hole 205 located opposite to the vent hole 205. The vent hole 205 may be formed in a concave portion 204 elongated in the horizontal direction so that as much air as possible can be introduced as shown in FIG. 15A.

The vent hole 205 may be formed at an upper portion of the concave portion 204 to minimize the inflow of foreign substances without being visible from the outside. In addition, an inclined surface 202 may be provided at a lower portion of the vent hole 205 so that air flowing into the vent hole 205 can flow toward the upper display 251.

The inclined surface 202 may be formed to obliquely face the upper side so as to send the air generated in the traveling direction toward the upper side of the mobile robot, and air may be introduced into the vent hole 205 along the inclined surface 202 when the mobile robot 1 travels.

The vent hole 205 may include a vent hole 205 (see FIG. 6) having the same structure in the backward direction. Air is introduced into the vent hole located in the traveling direction, and the air absorbing the heat is discharged to the other vent hole located in the opposite direction to the traveling direction.

When the mobile robot travels in the forward direction, air is introduced into the vent hole 205 formed at the front surface of the mobile robot, and heat is discharged to the other vent hole 205 formed at the rear surface of the mobile robot.

Figure 16A:
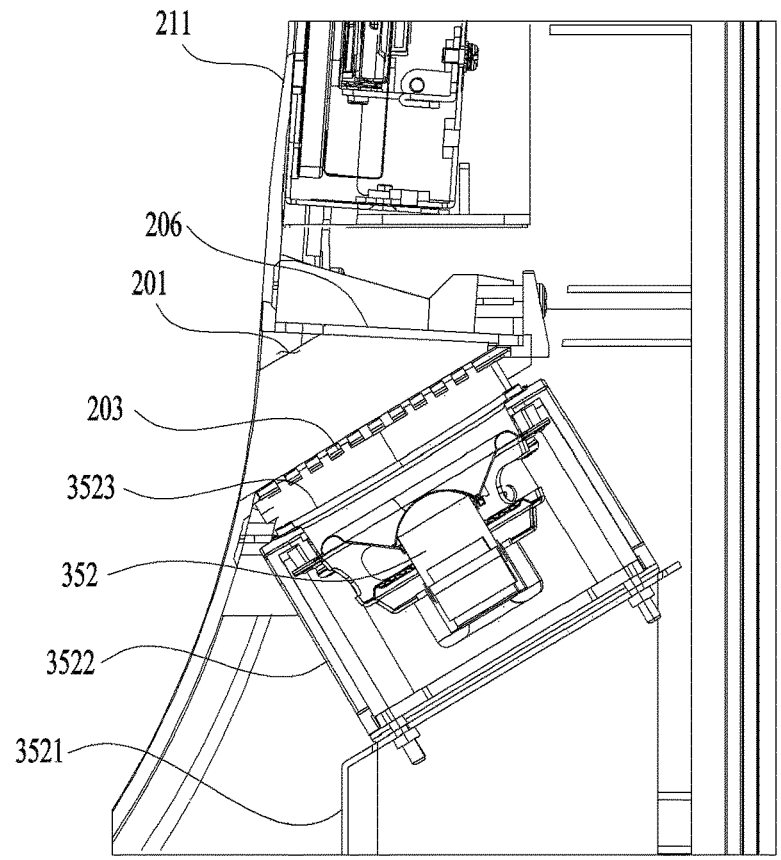
FIG. 16A is a cross-sectional view illustrating the speaker of the mobile robot according to an embodiment of the present disclosure.
Figure 16B:
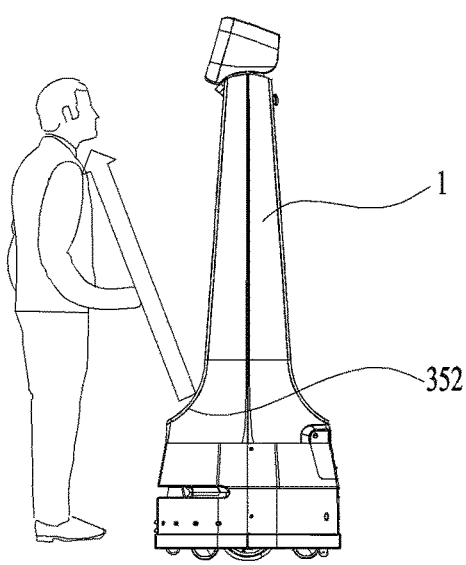
FIG. 16B is a view illustrating orientation of the speaker of the mobile robot relative to a user according to an embodiment of the present disclosure.

FIG. 16A is a cross-sectional view illustrating the mobile robot 1 taken along the line C-C' of FIG. 15A, and FIG. 16B is a view illustrating orientation of the speaker of the mobile robot 1 relative to a user according to an embodiment of the present disclosure.

The mobile robot 1 may further include a speaker 352 for communication with a user. Whereas the mobile robot 1 can communicate with the user only using the image or text displayed on the display 251, the mobile robot 1 can provide necessary information using artificial voice to provide the user with higher convenience.

In order to deliver sound through the speaker 352 in public places crowded with many people, the sound must be output toward the user's ears. However, the conventional mobile robot 1 does not include the speaker 352 or the speaker 352 is disposed in the side direction of the mobile robot 10, so that the user cannot recognize artificial voice of the mobile robot 1, thereby causing noise in public places.

Since the inclined surface 202 located under the vent hole 205 is obliquely disposed toward the upper side of the mobile robot, the inclined surface 202 is arranged to face the user's face as shown in FIG. 16B, and the speaker 352 is disposed at the inclined surface 202, thereby increasing the efficiency of the speaker 352.

At least one sound hole 203 may be formed at a portion of the inclined surface 202, and the sound holes 203 may be formed at the center portion of the structure shown in FIG. 16A.

In order to prevent rainwater from flowing into the speaker 352 through the sound holes 203, the waterproof film 3523 may be provided inside the sound holes 203. The waterproof film 3523 can prevent the speaker 352 from being contaminated because sound passes through the waterproof film 3523 but liquid substances such as water cannot pass through the waterproof film 3523.

In addition, the sound hole 203 is located at an inner position than the end of the concave portion 204 to minimize the inflow of rainwater. The vent hole 205 located at the upper portion of the sound hole 203 is blocked by the vent hole cover 206, so that the blocked vent hole 205 can prevent sound from flowing into the body 200 and being lost.

The speakers 352a and 352b according to the present disclosure may be symmetrically provided on the front and rear surfaces to face the user who uses the display 251.

Figure 17A:
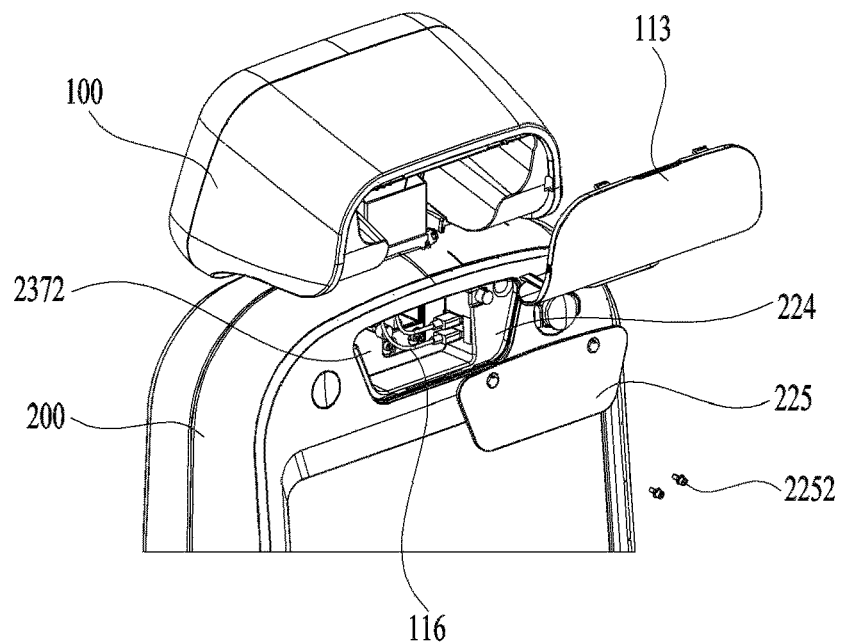
FIGS. 17A and 17B are rear views illustrating a method for separating the head of the mobile robot according to an embodiment of the present disclosure.
Figure 17B:
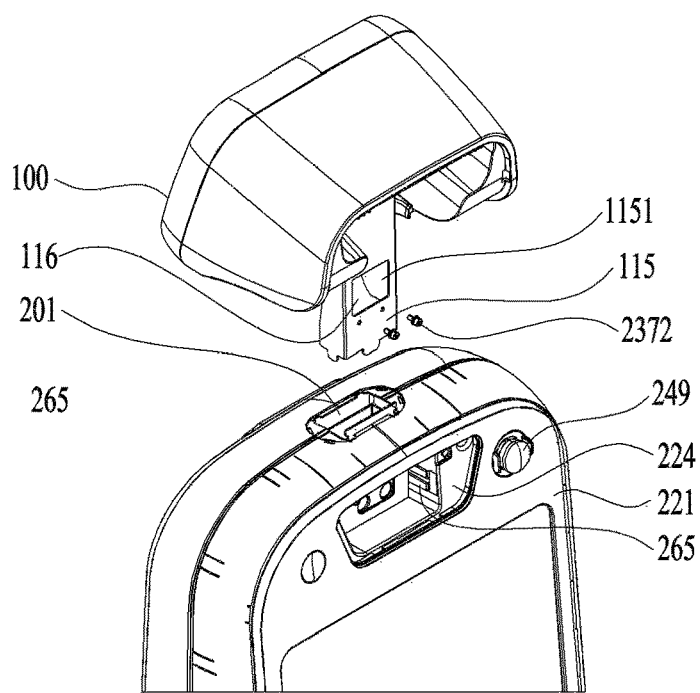
Figure 18A:
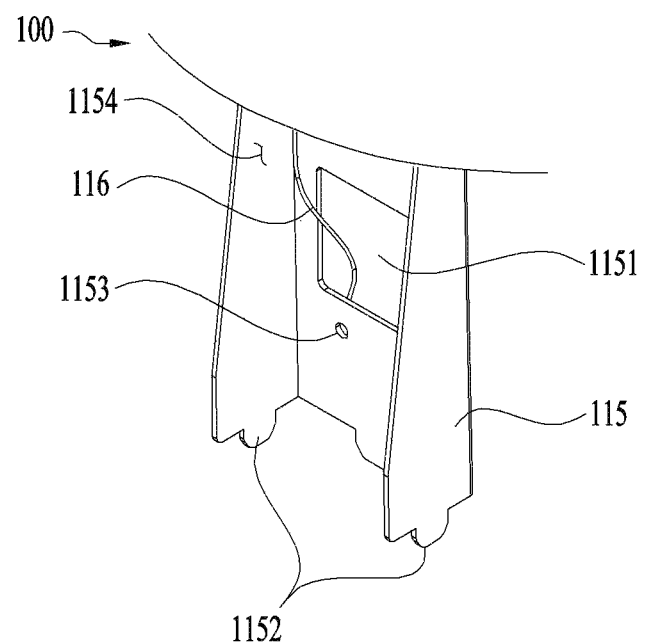
FIG. 18A is a view illustrating a head bracket of the mobile robot according to an embodiment of the present disclosure.
Figure 18B:
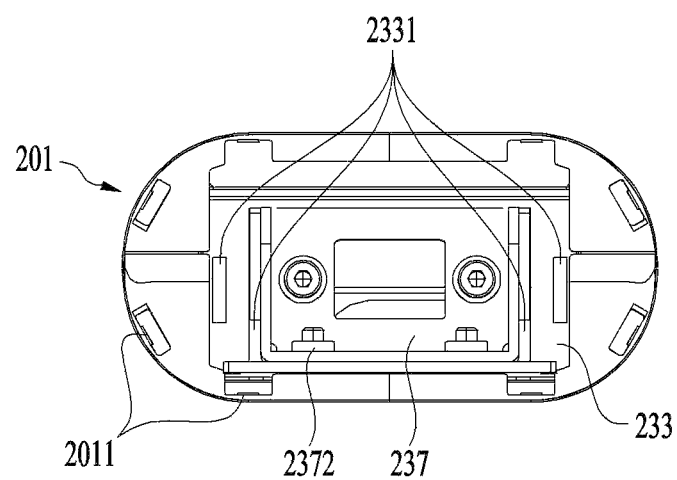
FIG. 18B is a view illustrating a head coupling hole for fastening the head of the mobile robot according to an embodiment of the present disclosure.

FIGS. 17A and 17B are rear views illustrating a method for separating the head 100 of the mobile robot 1 according to an embodiment of the present disclosure. FIGS. 18A and 18B are views illustrating a head bracket 115 and a head coupling hole 201 for fastening the head 100 of the mobile robot 1 according to an embodiment of the present disclosure.

FIGS. 19A to 21B illustrate various heads 100 or top cover 140 of the mobile robot 1 according to an embodiment of the present disclosure.

The head 100 of the mobile robot 1 according to the present disclosure can be detachably connected so that only the head 100 can be separated and replaced with another. As shown in FIGS. 19A to 21B, various types of heads 100 or top cover 140 can be replaced with one another as needed.

As shown in FIG. 1, the basic head 100 includes a head display 151 installed at the front surface of the mobile robot as shown in FIG. 1. The head rear cover 113 disposed at the rear surface of the head 100 is opened so that the head 100 can be separated from the body 200.

When the rear head cover 113 is opened, the head connection cable 116 connected to the display 251 can be separated. The head connection cable 116 may supply power to electronic products mounted in the head 100, so that the controller 380 of the mobile robot 1 may control the head display 151, etc. mounted in the head 100 through signal connection by the head connection cable 116.

The head connection cable 116 may extend downward along the bracket of the head 100 inserted into the upper side of the body 200, and can be connected through a connection port such as the USB port 265 provided in the body 200.

The head connection cable 116 may separate the head 100 from the body 200 by separating only one side of the port 265 of the head 100 and the port 265 of the body 200.

When the first repair cover 225 located at the rear surface of the body 200 is separated and the head connection cable 116 is removed from the USB port 265 of the body 200, the port of the head 100 can be removed from the mobile robot 1 together with the head 100 while connected to the head 100.

In this case, the head rear cover 113 of the head 100 need not be separated.

Figure 20A:
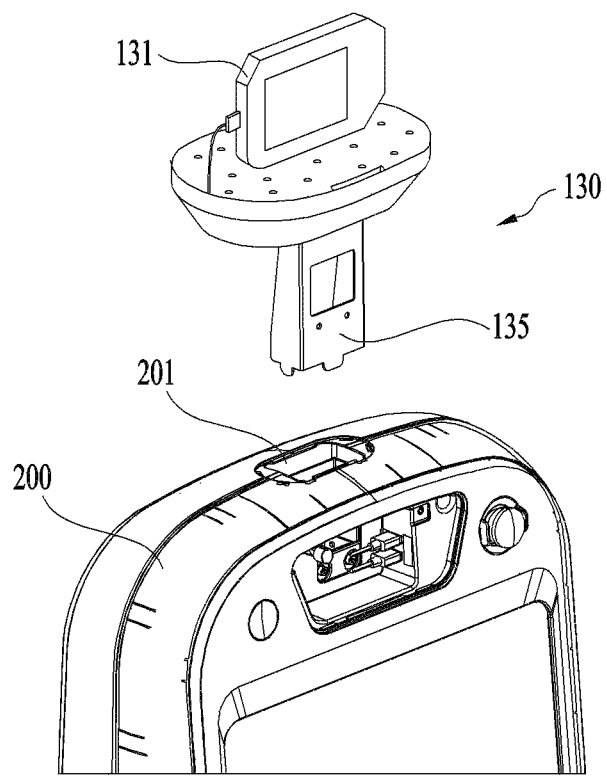
Figure 20B:
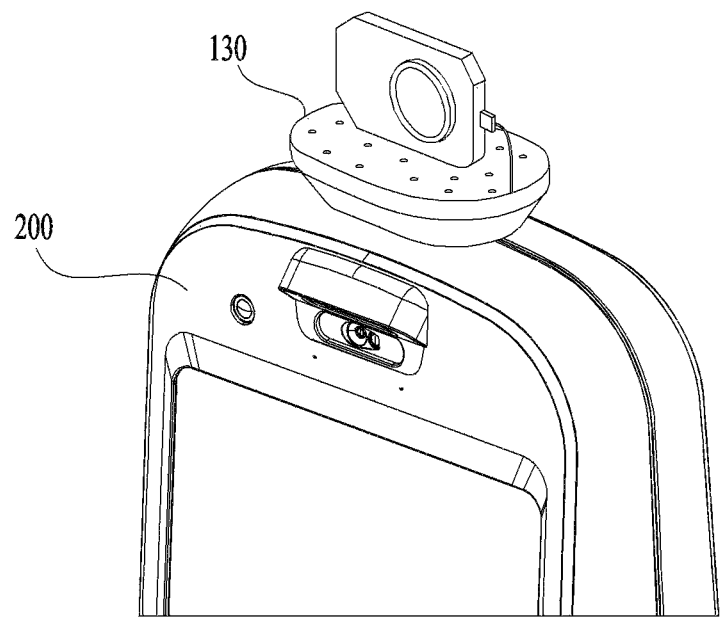

When the fixing bolt 2252 for fixing the first repair cover 225 is removed and the fixing bolt 2372 for fixing the head bracket 115 to the body 200 is removed, the head 100 can be separated from the body 200, as shown in FIG. 20B.

The connection between the head 100 and the body 200 implements a relatively simple structure, and the head connection cable can be easily connected or separated, so that replacement of the head 100 becomes easier compared to the conventional mobile robot 1.

In FIG. 18A, the head bracket 115 may be formed by bending and processing a rigid metal material.

The head bracket may be bent in a U-shape to construct the inner space 1154, so that the head connection cable 116 can be inserted into the body 200 together with the head bracket 115 without being caught by any obstacle. The head bracket 115 may include an open portion 1151, and can be connected to the connection port 265 of the body 200 after the head connection cable 116 passes through the open portion 1151.

A guide rib 1152 may protrude from the end of the head bracket 115, and may be inserted into the guide groove 2331 shown in FIG. 18B, so that the end of the head bracket 115 can be guided to be inserted into a correct position before the head bracket 115 is fastened to the bolt.

The guide groove 2331 may be formed in the head fixing frame 237 fixed to the top plate 233, and the guide groove 2331 may be located inside (or below) the head coupling hole 201 as compared to the head coupling hole 201.

When the guide rib 1152 of the head bracket 115 is inserted into the guide groove 2331 of the head fixing frame 237, the head bracket 115 surrounds the exterior of the head fixing frame 237 and fixes the head bracket 115 to the head fixing frame 237 using the fixing bolt 2372.

Figure 19A:
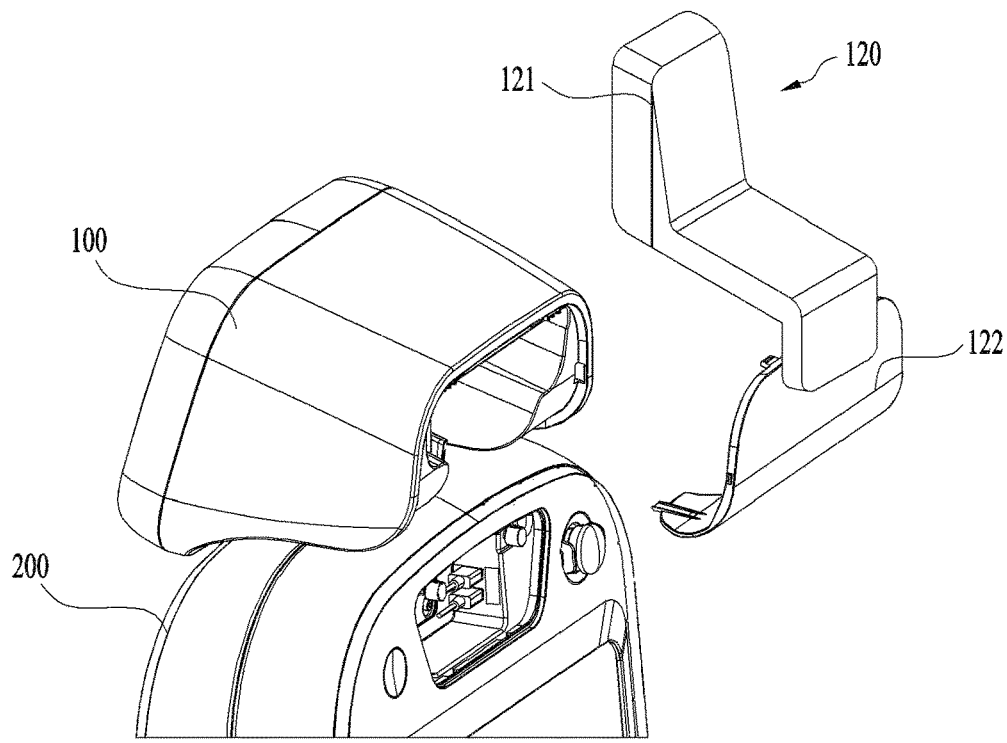
FIGS. 19A and 19B and FIGS. 20A and 20B are views illustrating different heads of the mobile robot according to an embodiment of the present disclosure.
Figure 19B:
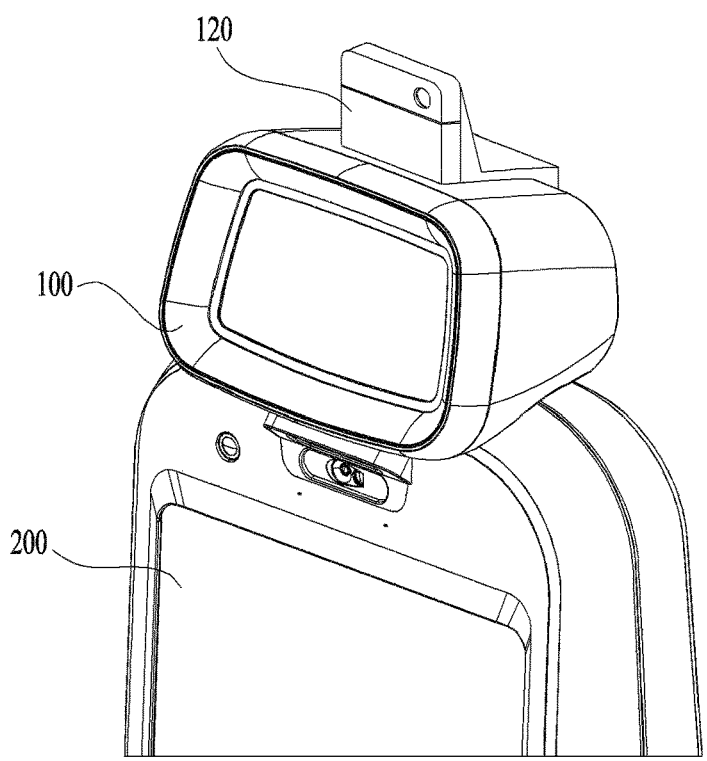

FIG. 19A illustrates an integrated head camera 121 attached to the mobile robot. A head rear cover 113 of the head 110 may be removed, and the head rear cover 120 equipped with the integrated head camera 121 may be coupled to the head 100, so that the camera 121 may be further attached to the upper portion of the existing head 100 as shown in FIG. 19B.

The connection cable of the head camera 121 may be inserted into the body 200 through the head bracket 115, so that the connection cable of the head camera 121 can be connected to the connection port 265 disposed over the body 200.

Alternatively, as shown in FIGS. 20A and 20B, the existing head 100 may be removed and a head camera module 130 having a head camera 131 may be attached to this removal position. In this case, the head camera 131 has less size restrictions or less direction restrictions so that a special-purpose camera 131 (for example, a 360° camera or a three-dimensional (3D) camera capable of generating 3D images) can be mounted as the head camera to the mobile robot.

As described above, the head camera module 130 is provided with the head bracket 135, and the connection cable of the head camera 131 is inserted into the body 200 through the head bracket 135, so that the connection cable can be connected to the connection port 265 disposed over the body 200. In addition to the camera 131, other configurations may also be mounted on the robot, such as a talking character facial image.

Figure 21A:
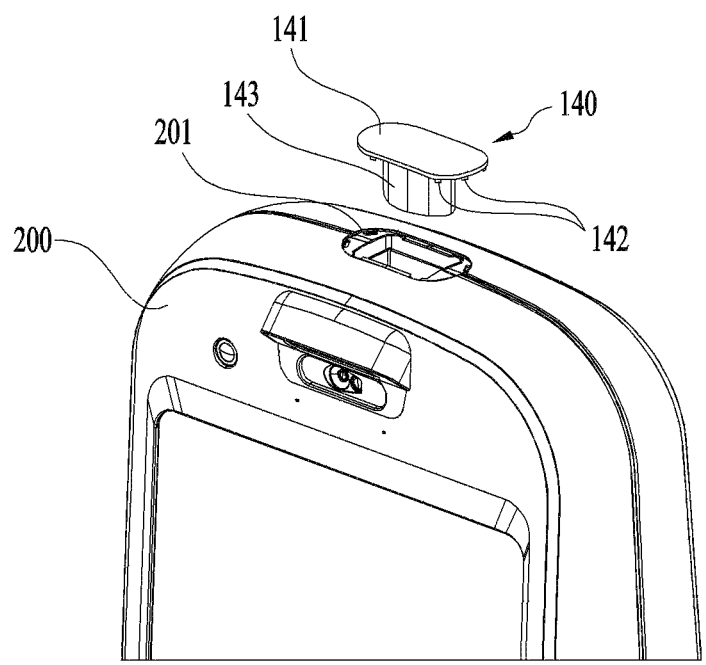
FIGS. 21A and B are views illustrating a top cover usable in place of a head of the mobile robot according to an embodiment of the present disclosure.
Figure 21B:
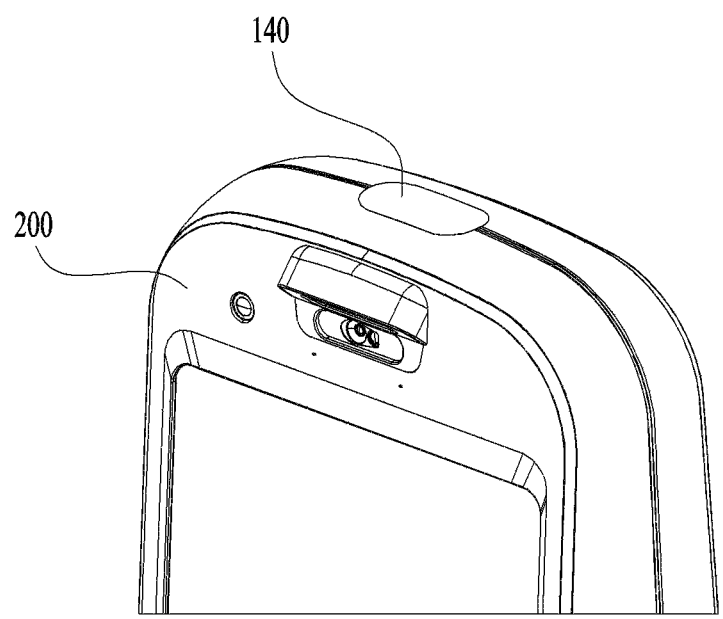

As shown in FIGS. 21A and 21B, the head 100 may be omitted, and the structure of FIG. 21A can be fastened to the head coupling hole 201 using the top cover 140, resulting in formation of a simple appearance without the head 100.

Unlike the above-described embodiment, the embodiment of FIGS. 21A and 21B aims to cover the head coupling hole 201 of the head 100 without coupling of heavy components so that the head bracket 115 can be omitted as necessary.

The structure of FIG. 21A may include a cover portion 141 having a surface continuous with the body case, and a plurality of hooks 142 formed around the bottom circumference of the cover portion 141. Since the top cover 140 is not fixed by a separate bolt or the like, the hook 142 is formed around the head coupling hole 201 to prevent easy separation of the top cover 140 and is then fastened to a hook groove 2011.

The structure of FIG. 21A may include an insertion portion 143 extending downward from the cover portion 141. When the first repair cover 224 is separated, the insertion portion 143 may be exposed through the rear opening 224 of the body 200, so that the insertion portion 143 moves upward, thereby removing the top cover 140.

As is apparent from the above description, the mobile robot 1 according to the present disclosure can freely replace a head module 100 so that it is easy to expand or change the function thereof.

The mobile robot 1 can allow air to be introduced into the vent hole 205 by a driving operation thereof, so that heat inside the mobile robot 1 can be discharged without using a separate cooling fan.

As the speaker 352 is arranged in the mobile robot 1 using the vent hole 205, the number of openings formed on the exterior of the mobile robot 1 can be reduced.

The speaker 352 of the mobile robot 1 is arranged in a manner that sound is output in an upward direction from a lower portion of the speaker toward the user's face, difficulties in using the mobile robot 1 in public places can be minimized, and even a short user can easily hear the sound generated by the mobile robot 1.

In addition, a display 251 is arranged at both sides of the mobile robot 1, so that the number of users capable of being handled by only one mobile robot 1 can increase.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A mobile robot comprising:
   a driver configured to provide a traveling function;
   a body disposed at an upper side of the driver, the body including a head coupling hole at an upper portion of the body and a repair opening facing rearward; and
   a head, the head including a head bracket releasably inserted into the head coupling hole of the body,
   wherein the body includes:
     a head fixing frame fastened to the head bracket by a first bolt; and
     a repair cover coupled to the repair opening, and
   wherein the head is releasable from the body when the first bolt is released from head bracket through the repair opening after removing the repair cover.

2. The mobile robot according to claim 1, wherein the body includes a top plate connected to the head fixing frame, the top plate having a guide groove, and
   wherein the head bracket includes a guide rib extending from an end of the head bracket, the guide rib being insertable into the guide groove of the top plate.

3. The mobile robot according to claim 1, wherein the body includes a connection port disposed adjacent to the head fixing frame, and
   wherein the head includes:
     a head display disposed at a front surface of the head; and
     a connection cable, the connection cable have a first end connected to the head display and a second end connected to the connection port.

4. The mobile robot according to claim 3, wherein the head bracket defines an inner space in which three sides are closed and one side is opened, the inner space extending in a vertical direction, and
   wherein the connection cable extends into the body along the inner space of the head bracket.

5. The mobile robot according to claim 4, wherein the head bracket includes an opening, and
   wherein the connection cable passes through the opening such that the second end of the connection cable is inserted into the connection port.

6. The mobile robot according to claim 1, wherein the head includes a replaceable head cover coupled to a rear surface thereof.

7. The mobile robot according to claim 1, wherein the replaceable head cover includes a camera.

8. The mobile robot according to claim 1, wherein the body includes a connection port disposed adjacent to the head fixing frame, and
   wherein the head includes:
     a cradle disposed at an upper portion of the head bracket, the cradle having a flat top surface;
     a head camera disposed on the flat top surface of the cradle; and
     a connection cable, the connection cable have a first end connected to the head camera and a second end connected to the connection port.

9. The mobile robot according to claim 1, wherein the repair cover is fastened to the body by a second bolt.

10. The mobile robot according to claim 1, further comprising a top cover fastenable to the head coupling hole when the head is released from the body.

11. The mobile robot according to claim 10, wherein the top cover includes:
    a cover portion corresponding to a shape of the head coupling hole; and
    a hook extending downward from a lower portion of the cover portion, and
    wherein the body further includes a hook groove disposed in the head coupling hole to receive the hook.

12. The mobile robot according to claim 11, wherein the top cover further includes an insertion portion protruding from the lower portion of the cover portion, the insertion portion extending into the head coupling hole, and the insertion portion being pushable to separate the top cover from the head coupling hole when the repair cover is removed.

13. The mobile robot according to claim 11, further comprising:
    a pair of displays located opposite each other at front and rear surfaces of the body, respectively;
    body profiles disposed at left and right sides of the body frame, the body profiles extending in a vertical direction; and
    display supports fixed to the body profiles to extend in a forward and rearward direction, the display supports being coupled to the pair of displays.

14. The mobile robot according to claim 13, wherein the display supports include:
    an upper display support disposed at an upper portion of the body;
    a lower display support disposed at a lower portion of the body; and
    a middle display support disposed between the upper display support and the lower display support,
    wherein the upper display support is shorter in length than the middle display support in the frontward and rearward direction, and
    wherein the lower display support is longer in length than the middle display support in the frontward and rearward direction.

15. The mobile robot according to claim 13, wherein each display support further includes a wing portion formed to extend in a direction away from the respective display.

16. The mobile robot according to claim 1, wherein the body includes:
    a concave portion recessed inward from a surface of the body, the concave portion having an upper side and a guide inclined surface defining a lower side of the concave portion; and
    a vent hole at the upper side of the concave portion, and
    wherein, during traveling of the driver, air is introduced into the body through the vent hole.

17. The mobile robot according to claim 16, further comprising:
a sound hole formed in the guide inclined surface; and
a speaker disposed in the sound hole.

18. The mobile robot according to claim 17, further comprising a vent roof cover covering the vent hole,
wherein the sound hole is located at an inner position relative to an outer end of the concave portion.

19. The mobile robot according to claim 1, wherein the driver includes a traveling unit including a plurality of wheels.

20. The mobile robot according to claim 19, wherein the driver includes a plurality of ultrasonic sensors or a lidar arranged at an outer surface of the driver.

* * * * *